US012451091B2

(12) United States Patent
Su et al.

(10) Patent No.: US 12,451,091 B2
(45) Date of Patent: Oct. 21, 2025

(54) TEMPERATURE CONTROL CIRCUIT AND TEMPERATURE CONTROL METHOD OF DRIVER CHIP AND TIMING CONTROL DRIVER BOARD

(71) Applicants: BEIJING BOE DISPLAY TECHNOLOGY CO., LTD., Beijing (CN); BOE TECHNOLOGY GROUP CO., LTD., Beijing (CN)

(72) Inventors: Guohuo Su, Beijing (CN); Zhihua Sun, Beijing (CN); Baoyu Liu, Beijing (CN); Yanjiao Pan, Beijing (CN); Xueliang Yang, Beijing (CN); Jing Ma, Beijing (CN); Jiantao Liu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/567,203

(22) PCT Filed: Feb. 28, 2023

(86) PCT No.: PCT/CN2023/078746

§ 371 (c)(1),
(2) Date: Dec. 5, 2023

(87) PCT Pub. No.: WO2024/178613

PCT Pub. Date: Sep. 6, 2024

(65) Prior Publication Data

US 2025/0087177 A1 Mar. 13, 2025

(51) Int. Cl.
*G09G 3/296* (2013.01)
*G09G 3/36* (2006.01)

(52) U.S. Cl.
CPC ....... *G09G 3/3614* (2013.01); *G09G 2310/08* (2013.01); *G09G 2320/041* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 8,890,423 | B2 | 11/2014 | Hu et al. |
| 9,230,490 | B2 | 1/2016 | Hu et al. |

(Continued)

FOREIGN PATENT DOCUMENTS

| | | | |
|---|---|---|---|
| CN | 103021344 | A | 4/2013 |
| CN | 103021346 | A | 4/2013 |

(Continued)

*Primary Examiner* — Amr A Awad
*Assistant Examiner* — Donna V Bocar
(74) *Attorney, Agent, or Firm* — Scully, Scott, Murphy & Presser, P.C.

(57) ABSTRACT

A temperature control circuit of a driver chip, a temperature control method of the driver chip, a power management integrated chip, a timing control driver board and a display apparatus are disclosed. The temperature control circuit includes a switching transistor, a comparison circuit and a control circuit; a first electrode of the switching transistor is connected with a first node, a second comparison end and the first electrode or a second electrode of the switching transistor are connected to a second node; the control circuit is configured to output a first reference voltage to the comparison circuit, the comparison circuit is configured to compare a magnitude relationship between a voltage on the second comparison end and the first reference voltage and output a comparison result; the control circuit acquires the comparison result and determines whether an output current on the boost circuit is excessively large.

17 Claims, 7 Drawing Sheets

(56) References Cited

U.S. PATENT DOCUMENTS

| | | | | |
|---|---|---|---|---|
| 9,274,357 | B2 | 3/2016 | Takahashi | |
| 10,193,563 | B2 | 1/2019 | Shionoiri et al. | |
| 2013/0328854 | A1* | 12/2013 | Ruan | G09G 3/3696 345/212 |
| 2014/0139419 | A1 | 5/2014 | Zhang et al. | |
| 2018/0174536 | A1* | 6/2018 | Zhang | G09G 3/3648 |
| 2019/0147783 | A1* | 5/2019 | Nam | G09G 3/3266 345/55 |
| 2024/0046846 | A1 | 2/2024 | Li | |
| 2024/0078947 | A1* | 3/2024 | Koh | G09G 3/20 |

FOREIGN PATENT DOCUMENTS

| | | | |
|---|---|---|---|
| CN | 103165085 | A | 6/2013 |
| CN | 103377631 | A | 10/2013 |
| CN | 210091003 | U | 2/2020 |
| CN | 114220369 | A | 3/2022 |
| TW | 201622359 | A | 6/2016 |

* cited by examiner

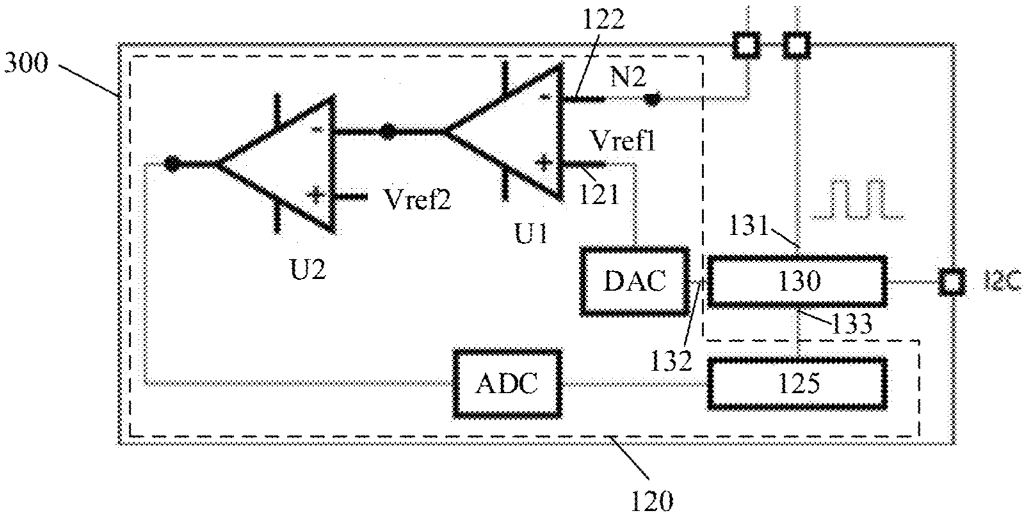
FIG. 8
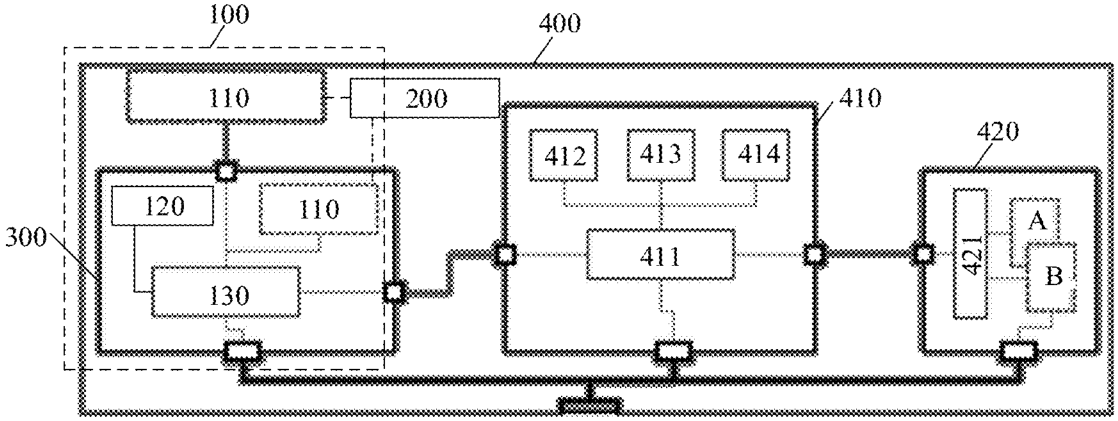
FIG. 9
| LUT1（12bit） | | | |
|---|---|---|---|
| | R | G | B |
| 0 | 0 | 0 | 0 |
| 1 | 16 | 16 | 16 |
| 2 | 32 | 32 | 32 |
| … | … | … | … |
| … | … | … | … |
| … | … | … | … |
| 253 | 4048 | 4048 | 4048 |
| 254 | 4064 | 4064 | 4064 |
| 255 | 4080 | 4080 | 4080 |
| LUT2（12bit） | | | |
|---|---|---|---|
| | R | G | B |
| 0 | 0 | 0 | 0 |
| 1 | 15 | 15 | 15 |
| 2 | 31 | 31 | 31 |
| … | … | … | … |
| … | … | … | … |
| … | … | … | … |
| 253 | 3568 | 3568 | 3568 |
| 254 | 3584 | 3584 | 3584 |
| 255 | 3600 | 3600 | 3600 |
FIG. 10

TEMPERATURE CONTROL CIRCUIT AND TEMPERATURE CONTROL METHOD OF DRIVER CHIP AND TIMING CONTROL DRIVER BOARD

CROSS-REFERENCE TO RELATED APPLICATION

This application is a U.S. National Phase of International Application No. PCT/CN2023/078746, filed on Feb. 28, 2023, the entire disclosure of which is incorporated herein by reference as part of the present application.

TECHNICAL FIELD

Embodiments of the present disclosure relate to a temperature control circuit of a driver chip, a temperature control method of the driver chip, a power management integrated chip, a timing control driver board and a display apparatus.

BACKGROUND

With continuous development of display technology, large size, high resolution, and high refresh frequency have become a development trend of display apparatuses, and at the same time, also leads to problems of excessively high power consumption of display apparatuses and excessively high temperature of driver chips (data driven integrate circuits). For example, in a display apparatus with a resolution of 8 K and a refresh frequency of 120 Hz, a surface temperature of a Chip On Film (COF) provided with a driver chip exceeds 150 degrees Celsius. For another example, in a high refresh rate display apparatus with a resolution of 4 K and a refresh frequency of 480 Hz, a surface temperature of a Chip On Film (COF) provided with a driver chip will also far exceed 150 degrees Celsius.

On the other hand, in a usual semiconductor manufacturing process, a junction temperature specification of the driver chip is only 150 degrees Celsius, and an operation surface temperature specification thereof is below 150 degrees Celsius. Therefore, if no cooling measures are taken, the driver chip is very likely to burn out, leading to product accidents.

SUMMARY

The embodiments of the present disclosure relate to a temperature control circuit of a driver chip, a temperature control method of the driver chip, a power management integrated chip, a timing control driver board and a display apparatus. The temperature control circuit of the driver chip can determine whether a present driving current exceeds a large current threshold by presetting a first reference voltage that reflects the large current threshold of the driving current, and then detecting whether a voltage on a second node is greater than the first reference voltage, so as to determine whether the driver chip needs to be cooled; and then, lower the temperature of the driver chip through a series of cooling modes, so as to avoid burning the driver chip.

At least one embodiment of the present disclosure provides a temperature control circuit of a driver chip, which includes: a switching transistor, including a gate electrode, a first electrode and a second electrode; a comparison circuit, including a first comparison end and a second comparison end; and a control circuit, including a first connection end, a second connection end and a third connection end, the first connection end is electrically connected with the gate electrode of the switching transistor; the second connection end is electrically connected with the first comparison end; and the third connection end is electrically connected with an output end of the comparison circuit; the first electrode of the switching transistor is connected with a first node located between an inductor of a boost circuit and a Schottky diode; the second comparison end and the first electrode or the second electrode of the switching transistor are connected to the second node; the boost circuit is configured to supply a driving voltage to the driver chip; the control circuit is configured to output a first reference voltage to the comparison circuit through the second connection end; the comparison circuit is configured to compare a magnitude relationship between a voltage on the second comparison end and the first reference voltage and output a comparison result; the control circuit acquires the comparison result through the third connection end, and determines whether an output current on the boost circuit is excessively large according to the comparison result.

For example, in the temperature control circuit provided by an embodiment of the present disclosure, the first reference voltage is a voltage on the second node upon a temperature of the driver chip exceeding a preset value.

For example, in the temperature control circuit provided by an embodiment of the present disclosure, the second electrode of the switching transistor is grounded; the second comparison end and the first electrode of the switching transistor are connected to the second node; and the second node is connected with the first node.

For example, the temperature control circuit provided by an embodiment of the present disclosure further includes: a first resistor, located between the first electrode of the switching transistor and the second node.

For example, the temperature control circuit provided by an embodiment of the present disclosure further includes: a second resistor, including a first end and a second end, the second comparison end, the second electrode of the switching transistor, and the first end of the second resistor are connected to the second node; and the second end is grounded.

For example, the temperature control circuit provided by an embodiment of the present disclosure further includes: a third resistor, including a first end and a second end, the first end of the third resistor is connected with the gate electrode of the switching transistor; and the second end of the third resistor is grounded.

For example, in the temperature control circuit provided by an embodiment of the present disclosure, the control circuit is further configured to lower a temperature of the driver chip according to the comparison result.

For example, in the temperature control circuit provided by an embodiment of the present disclosure, the control circuit is configured to supply a gate electrode signal to the gate electrode of the switching transistor through the first connection end; and the control circuit is further configured to adjust a duty cycle or a pulse frequency of the gate electrode signal according to the comparison result.

For example, in the temperature control circuit provided by an embodiment of the present disclosure, the comparison circuit includes: a first operational amplifier, including a first input end, a second input end, an output end, a first power input end and a second power input end, the first input end is the first comparison end; the second input end is the second comparison end; the first power input end is connected with a first positive voltage; and the second power input end is connected with a negative voltage.

For example, in the temperature control circuit provided by an embodiment of the present disclosure, the comparison circuit further includes: a second operational amplifier, including a first input end, a second input end, an output end a first power input end and a second power input end, the first input end is connected with a 0V voltage or a second reference voltage less than the first reference voltage; the second input end is connected with an output end of the first operational amplifier; the first power input end is connected with a second positive voltage; and the second power input end is connected with a 0V voltage.

For example, in the temperature control circuit provided by an embodiment of the present disclosure, the comparison circuit further includes: a register, including an input end and an output end; a digital-to-analog converter, including an input end and an output end; and an analog-to-digital converter, including an input end and an output end; the input end of the digital-to-analog converter is connected with the second connection end; the output end of the digital-to-analog converter is connected with the second comparison end; the input end of the analog-to-digital converter is connected with the output end of the second operational amplifier; the output end of the analog-to-digital converter is connected with the input end of the register; and the output end of the register is connected with the third connection end.

At least one embodiment of the present disclosure further provides a power management integrated chip, which includes the comparison circuit and the control circuit in the temperature control circuit.

At least one embodiment of the present disclosure further provides a timing control driver board, which includes: a boost circuit, configured to supply a driving voltage to the driver chip; and the temperature control circuit.

For example, the timing control driver board provided by an embodiment of the present disclosure further includes: a power management integrated chip, the comparison circuit and the control circuit in the temperature control circuit are integrated into the power management integrated chip.

For example, in the timing control driver board provided by an embodiment of the present disclosure, the switching transistor in the temperature control circuit is integrated into the power management integrated chip.

For example, in the timing control driver board provided by an embodiment of the present disclosure, the boost circuit includes: an input capacitor, having one end connected with the input end of the boost circuit, an inductor, having one end connected with the input end of the boost circuit, and the other end connected with the first node; a Schottky diode, having one end connected with the first node, and the other end connected with the output end of the boost circuit; and an output capacitor, having one end connected with the output end of the boost circuit.

For example, the timing control driver board provided by an embodiment of the present disclosure further includes a timing control chip, the timing control chip includes: a micro-control unit; and an accurate color-temperature adjusting unit, configured to adjust a grayscale of a display picture, the micro-control unit is respectively in communicative connection with the control circuit and the accurate color-temperature adjusting unit; and the micro-control unit is configured to reduce the grayscale of the display picture according to the comparison result through the accurate color-temperature adjusting unit.

For example, in the timing control driver board provided by an embodiment of the present disclosure, the timing control chip further includes: a polarity reversing unit, being in communicative connection with the micro-control unit; the micro-control unit is configured to reduce times of polarity reversal of the display picture through the polarity reversing unit according to the comparison result.

For example, in the timing control driver board provided by an embodiment of the present disclosure, the timing control chip further includes: a frequency-variable refreshing unit, being in communicative connection with the micro-control unit; the micro-control unit is configured to reduce a refresh frequency of the display picture according to the comparison result through the frequency-variable refreshing unit.

For example, the timing control driver board provided by an embodiment of the present disclosure further includes a programmable gamma chip, wherein, the programmable gamma chip includes: a controller, being in communicative connection with the micro-control unit; a first gamma voltage bank, being in communicative connection with the controller; a second gamma voltage bank, being in communicative connection with the controller, the micro-control unit is configured to switch between the first gamma voltage bank and the second gamma voltage bank through the controller according to the comparison result; with respect to a same grayscale, a gamma voltage in the second gamma voltage bank is less than a gamma voltage in the first gamma voltage bank.

At least one embodiment of the present disclosure provides a display apparatus, which includes the timing control driver board.

At least one embodiment of the present disclosure provides a temperature control method of a driver chip, which includes: connecting the temperature control circuit according to any one of claims 1 to 11 with the boost circuit that supplies a driving voltage for the driver chip; detecting a temperature of the driver chip and the driving current at the output end of the boost circuit; and acquiring the driving current as a large current threshold, upon the temperature of the driver chip exceeding a preset value; determining a source-drain current threshold of the second node according to the large current threshold, and determining the first reference voltage according to the source-drain current threshold; comparing a relationship between the voltage on the second node and the first reference voltage in real time through the comparison circuit; and determining, by the control circuit, that the output current exceeds the large current threshold, upon the driving current exceeding the large current threshold.

For example, in the temperature control method provided by an embodiment of the present disclosure further includes: reducing, by the control circuit, a duty cycle or a pulse frequency of a gate electrode signal on the gate electrode of the switching transistor, to lower the temperature of the driver chip, upon the control circuit determining that the output current exceeds the large current threshold.

For example, in the temperature control method provided by an embodiment of the present disclosure further includes: reducing a grayscale of the display picture to lower the temperature of the driver chip, upon the control circuit determining that the output current exceeds the large current threshold.

For example, in the temperature control method provided by an embodiment of the present disclosure further includes: reducing times of polarity reversal of the display picture to lower the temperature of the driver chip, upon the control circuit determining that the output current exceeds the large current threshold.

For example, in the temperature control method provided by an embodiment of the present disclosure further includes: reducing a refresh frequency of the display picture to lower the temperature of the driver chip, upon the control circuit determining that the output current exceeds the large current threshold.

For example, in the temperature control method provided by an embodiment of the present disclosure further includes: reducing a gamma voltage value of the display picture to lower the temperature of the driver chip, upon the control circuit determining that the output current exceeds the large current threshold.

BRIEF DESCRIPTION OF DRAWINGS

In order to clearly illustrate the technical solution of the embodiments of the present disclosure, the drawings of the embodiments will be briefly described below; it is obvious that the described drawings are only related to some embodiments of the present disclosure and thus are not limitative of the present disclosure.

FIG. 8 is a schematic diagram of a power management integrated chip provided by an embodiment of the present disclosure;

FIG. 9 is a schematic diagram of a timing control driver board provided by an embodiment of the present disclosure;

FIG. 10 shows a charge and discharge comparison table of different grayscales provided by an embodiment of the present disclosure;

DETAILED DESCRIPTION

Figure 1:
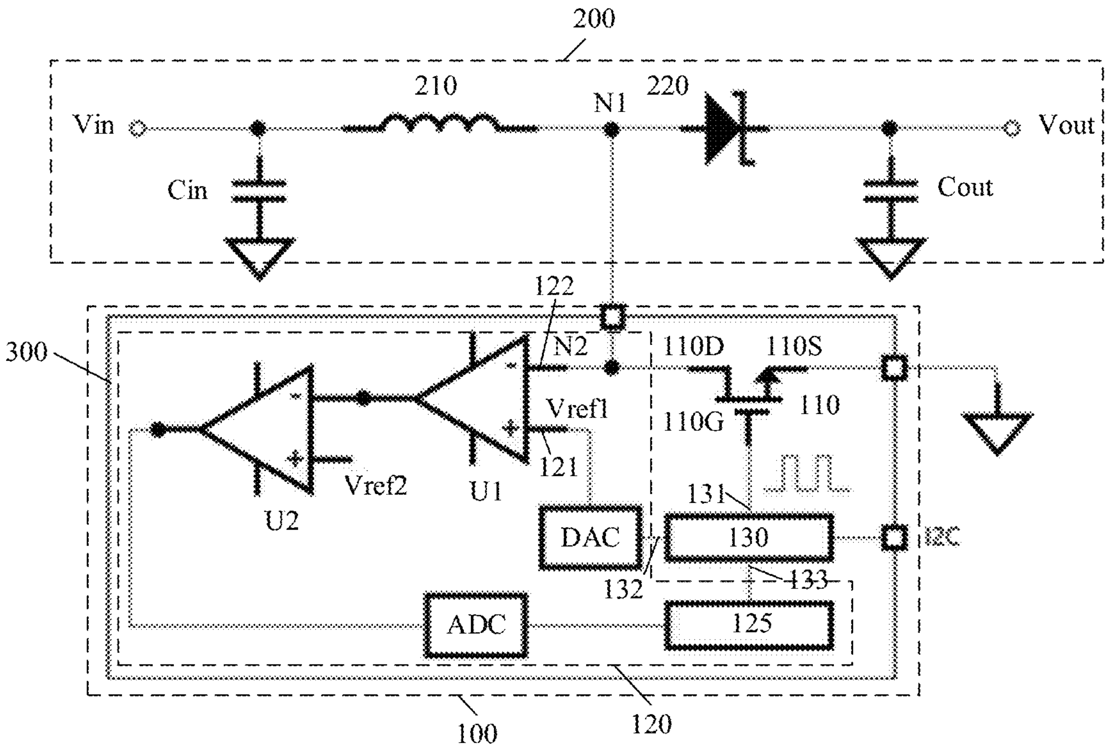
FIG. 1 is a schematic diagram of a temperature control circuit of a driver chip provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. Similar words such as "connected" or "connected" are not limited to physical or mechanical connection, but can include electrical connection, whether direct or indirect.

It should be noted that transistors adopted in embodiments of the present disclosure can be thin film transistors, field-effect transistors, or other switching devices with same characteristics. Due to symmetry of the source electrode and the drain electrode of transistor, there is no difference in structure thereof, so the transistors can be replaced with each other. In the embodiments of the present disclosure, in order to distinguish the source electrode and the drain electrode of the transistor, one of the source electrode and the drain electrode is referred to as a first electrode, and the other of the source electrode and the drain electrode is referred to as a second electrode. In addition, according to characteristics of transistors, the transistors can be divided into N-type transistors and P-type transistors; upon adopting an N-type transistor, a gate electrode inputs a high level, and the first electrode and the second electrode are turned on; upon adopting a P-type transistor, a gate electrode inputs a low level, and the first electrode and the second electrode are turned on.

In order to solve the problem of excessively high temperature the driver chip in large-sized, high-resolution, and high refresh frequency display apparatuses, there are usually several cooling modes below:

I. Adhering a heat dissipation fin of copper or graphene, etc. on the Chip On Film (COF) provided with a driver chip to implement cooling. However, such a mode will result in cost increase of at least 15% or more for the product, and even if some high-power products are adhered with heat dissipation fins, the temperature of the COF is difficult to reduce into product specifications.

II. Through structural design, the COF provided with the driver chip is placed in contact with a metal structure, to implement temperature reduction through thermal conduction. However, a cooling effect of such a mode is not as good as that of mode I.

III. The timing control driver board (Tcon) adopts a mode of pattern detect, to detect regular patterns; and for patterns with high power consumption, changing a data driving mode can reduce product power consumption and thus lower the temperature of the Chip On Film (COF). However, during a normal picture display process of the display apparatus, an image upon the driving current being large is usually irregular and is difficult to detect through the mode of pattern detect.

In this regard, an inventor of the present application conceives of that a most direct way to lower the temperature of the driver chip is to reduce power consumption of the driver chip; generally speaking, a driving voltage (AVDD) of each product is fixed, and as power consumption of the driver chip increases, the driving current also increases; so, power consumption of the driver chip can be determined by detecting a magnitude of the driving current, so that a situation of excessively high temperature of the driver chip can be recognized in real time; upon it being recognized that the driving current of the driver chip is large, power consumption of the driver chip can be reduced in different modes. For example, power consumption of the driver chip can be reduced by reducing the driving voltage, because the higher the driving voltage of the driver chip, the greater the gap relative to the pixel driving voltage, leading to higher dissipation power consumption of the driver chip; meanwhile, the driving voltage (AVDD) is a reference voltage of the gamma voltage; upon the driving voltage decreasing, the gamma voltage also decreases, which reduces fluctuation of a grayscale voltage between lines of the display picture, so that overall load of the display apparatus decreases and power consumption of the driver chip also decreases. Therefore, reducing the driving voltage can effectively lower the temperature of the driver chip. In addition, load of the display apparatus can be reduced through communicating with the timing control chip (Tcon chip) of the display apparatus, and then adjusting functions of different modules, so as to reduce power consumption and temperature of the driver chip.

The embodiments of the present disclosure provide a temperature control circuit of a driver chip, a temperature control method of the driver chip, a power management integrated chip, a timing control driver board and a display apparatus. The temperature control circuit of the driver chip includes a switching transistor, a comparison circuit and a control circuit; the switching transistor includes a gate electrode, a first electrode and a second electrode; the comparison circuit includes a first comparison end and a second comparison end; the control circuit includes a first connection end, a second connection end and a third connection end; the first connection end is electrically connected with the gate electrode of the switching transistor, the second connection end is electrically connected with the first comparison end, and the third connection end is electrically connected with an output end of the comparison circuit; the first electrode of the switching transistor is connected with a first node located between an inductor of a boost circuit and a Schottky diode, the second comparison end and the first electrode or the second electrode of the switching transistor are connected to a second node, the boost circuit is configured to supply a driving voltage to the driver chip; the control circuit is configured to output a first reference voltage to the comparison circuit through the second connection end, the comparison circuit is configured to compare a magnitude relationship between a voltage on the second comparison end and the first reference voltage and output a comparison result; the control circuit acquires the comparison result through the third connection end and determines whether an output current on the boost circuit is excessively large according to the comparison result. Thus, the temperature control circuit of the driver chip can determine whether the present driving current exceeds the large current threshold by presetting the first reference voltage that reflects the large current threshold of the driving current, and then detecting whether the voltage on the second node is greater than the first reference voltage, so as to determine whether the driver chip needs to be cooled; and then, lower the temperature of the driver chip through a series of cooling modes, so as to avoid burning the driver chip.

Hereinafter, the temperature control circuit of the driver chip, the temperature control method of the driver chip, the power management integrated chip, the timing control driver board and the display apparatus provided by the embodiments of the present disclosure will be described in detail in conjunction with the accompanying drawings.

An embodiment of the present disclosure provides a temperature control circuit of a driver chip. FIG. 1 is a schematic diagram of a temperature control circuit of a driver chip provided by an embodiment of the present disclosure.

As illustrated by FIG. 1, the temperature control circuit 100 of the driver chip includes a switching transistor 110, a comparison circuit 120 and a control circuit 130; the switching transistor 110 includes a gate electrode 110G, a first electrode 110D and a second electrode 110S; the comparison circuit 120 includes a first comparison end 121 and a second comparison end 122; and the control circuit 130 includes a first connection end 131, a second connection end 132 and a third connection end 133. The first connection end 131 is electrically connected with a gate electrode 110G of the switching transistor 110, the second connection end 132 is electrically connected with the first comparison end 121, and the third connection end 133 is electrically connected with an output end of the comparison circuit 120; the first electrode 110D of the switching transistor 110 is connected with a first node N1 located between an inductor 210 of a boost circuit 200 and a Schottky diode 220, the second comparison end 122 and the first electrode 110D or the second electrode 110S of the switching transistor 110 are connected to a second node N2; the boost circuit 200 is configured to supply a driving voltage to the driver chip; the control circuit 130 is configured to output a first reference voltage Vref1 to the comparison circuit 120 through the second connection end 132, the comparison circuit 120 is configured to compare a magnitude relationship between a voltage on the second comparison end 122 and the first reference voltage Vref1 and output a comparison result; and the control circuit 130 acquires the comparison result through the third connection end 133 and determines whether an output current on the boost circuit 200 is excessively large according to the comparison result.

In the temperature control circuit of the driver chip provided by the embodiment of the present disclosure, it is determined whether the present driving current exceeds the large current threshold, by presetting the first reference voltage that reflects the large current threshold of the driving current, and then using the comparison circuit to compare whether the voltage on the second node is greater than the first reference voltage, so as to determine whether the driver chip needs to be cooled; and then the temperature of the driver chip is lowered through a series of cooling modes, so as to avoid burning the driver chip. It should be noted that the above-described driver chip can also be referred to as a data driver chip.

In some examples, as illustrated by FIG. 1, the first reference voltage Vref1 is a voltage on the second node N2 upon the driver chip temperature exceeding a preset value, so that the first reference voltage Vref1 can serve as a comparison reference, to determine whether the temperature of the driver chip is excessively high.

It should be noted that in the case that the internal resistance of switching transistors is large and internal resistance uniformity of switching transistors of different products is good, by detecting the temperature of the driver chip and the driving current at the output end of the boost circuit, upon the temperature of the driver chip exceeding a preset value, the driving current is acquired as the large current threshold; then a source-drain current threshold of the second node is determined according to the large current threshold; in this case, the source-drain current threshold on the second node can be directly multiplied by the internal resistance of the switching transistor to obtain the above-described first reference voltage. Upon the internal resistance of the switching transistor being small and internal resistance uniformity of switching transistors of different products is poor, a resistor can be connected in series on a branch where the switching transistor is located, and then the source-drain current threshold on the second node is multiplied by a resistance value of the resistor, so that the above-described first reference voltage can be acquired.

For example, a preset value of the above-described driver chip temperature can be 150 degrees Celsius, 140 degrees Celsius, or 130 degrees Celsius. Of course, the embodiments of the present disclosure include but are not limited thereto, and the preset value can be selected according to actual situations.

For example, a value of the first reference voltage Vref1 ranges from 1 V to 16 V. The value range is based on empirical values obtained after extensive testing of specific products.

In some examples, as illustrated by FIG. 1, the second electrode 110S of the switching transistor 110 is grounded; the second comparison end 122 and the first electrode 110D of the switching transistor 110 are connected to the second node N2; and the second node N2 is connected with the first node N1. Thus, upon the boost circuit 200 being in a charge stage, the current can pass through the switching transistor 110 and charge the inductor 210. In such case, the source-drain current threshold in a position of the first electrode 110D of the switching transistor 110 can be determined according to the large current threshold, and then the source-drain current threshold can be directly multiplied by the internal resistance of the switching transistor 110 to obtain the above-described first reference voltage Vref1; during an operation process of the temperature control circuit, a magnitude relationship between the voltage on the first electrode 110D of the switching transistor 110 and the first reference voltage Vref1 can be compared through the comparison circuit 120, to determine whether the present driving current exceeds the large current threshold, thereby determining whether the driver chip needs to be cooled.

In some examples, as illustrated by FIG. 1, the comparison circuit 120 includes a first operational amplifier U1, which includes a first input end, a second input end, an output end, a first power input end and a second power input end; the first input end is a first comparison end 121, the second input end is a second comparison end 122, the first power input end is connected with a first positive voltage, and the second power input end is connected with a negative voltage. Thus, the first operational amplifier U1 can compare a magnitude relationship of voltages on the first comparison end 121 and the second comparison end 122. Upon the voltage of the first comparison end 121 being greater than the voltage of the second comparison end 122, the voltage on the output end is a positive voltage; that is to say, upon the first reference voltage Vref1 being greater than the voltage on the second node N2, the voltage on the output end is a positive voltage; upon the voltage of the first comparison end 121 being less than the voltage of the second comparison end 122, the voltage on the output end is a negative voltage, that is to say, upon the first reference voltage Vref1 being less than the voltage on the second node N2, the voltage on the output end is a negative voltage.

In some examples, as illustrated by FIG. 1, the comparison circuit 120 further includes a second operational amplifier U2, which includes a first input end, a second input end, an output end, a first power input end and a second power input end; the first input end is connected with a 0V voltage or a second reference voltage less than the first reference voltage Vref1, the second input end is connected with the output end of the first operational amplifier, the first power input end is connected with a second positive voltage, and the second power input end is connected with a 0V voltage. At this time, upon the voltage on the output end of the first operational amplifier being a negative voltage, the output end of the second operational amplifier U2 is a positive voltage; and upon the voltage on the output end of the first operational amplifier being a positive voltage, the output end of the second operational amplifier U2 is a 0V voltage. Thus, the second operational amplifier U2 can act as an inverter, and can convert the voltage on the output end of the first operational amplifier U1 into a positive voltage.

Table 1 shows a determination process table of a temperature control circuit provided by an embodiment of the present disclosure.

| Situation of driving | U1 is powered by a positive voltage and a negative voltage, and U2 is powered by a positive voltage and 0 V, 0 ≤ Vref2 < Vref1 | | |
|---|---|---|---|
| current | U1 | U1 output end | U2 output end |
| Large current | Vd > Vref1 | Negative voltage | Positive voltage |
| Non-large current | Vd < Vref1 | Positive voltage | 0 V |

As illustrated by Table 1, upon the driving current being a large current (i.e., that exceeds the large current threshold), the voltage Vd on the second node N2 is greater than the first reference voltage Vref1, the voltage on the output end of the first operational amplifier U1 is a negative voltage, and the voltage on the output end of the second operational amplifier U2 is a positive voltage; upon the driving current being a large current (i.e., that is less than the large current threshold), the voltage Vd on the second node N2 is less than the first reference voltage Vref1, the voltage on the output end of the first operational amplifier is a positive voltage, and the voltage on the output end of the second operational amplifier U2 is 0 V.

In some examples, as illustrated by FIG. 1, the comparison circuit 120 further includes a register 125, a digital-to-analog converter DAC and an analog-to-digital converter ADC; the register 125 includes an input end and an output end; the digital-to-analog converter DAC includes an input end and an output end; the analog-to-digital converter ADC includes an input end and an output end; the input end of the digital-to-analog converter DAC is connected with the second connection end 132, the output end of the digital-to-analog converter DAC is connected with the second comparison end 122; the input end of the analog-to-digital converter ADC is connected with the output end of the second operational amplifier U2, the output end of the analog-to-digital converter ADC is connected with the input end of the register 125, and the output end of the register 125 is connected with the third connection end 133. Thus, the comparison circuit 120 can convert a digital signal output by the control circuit 130 into an analog signal, that is, the first reference voltage Vref1, through the digital-to-analog converter, so as to facilitate comparison by the first operational amplifier; and convert the analog signal on the output end of the second operational amplifier U2 into a digital signal through the analog-to-digital converter and transmit that same to the register 125.

It should be noted that the above-described analog-to-digital converter is an electronic element or circuit that converts an analog signal into a digital signal; the above-described digital-to-analog converter is an electronic element or circuit that converts a digital signal into an analog signal; the above-described register can store a binary code, which can be stored as 1 upon the voltage on the output end of the second operational amplifier being a positive voltage, and can be stored as 0 upon the voltage on the output end of the second operational amplifier being a 0V voltage.

In some examples, as illustrated by FIG. 1, the above-described boost circuit 200 includes an input capacitor Cin, an inductor 210, a Schottky diode 220, and an output capacitor Cout; one end of the input capacitor Cin is connected with the input end of the boost circuit 200; the inductor 210 has one end connected with the input end of the boost circuit 200, and the other end connected to the first node N1; the Schottky diode 220 has one end connected with the first node N1, and the other end connected with the output end of the boost circuit 200. Thus, in the charge stage, the switching transistor 110 is turned on, the voltage of the first node N1 is less than the voltage at the output end of the boost circuit 200, the Schottky diode 220 is turned off, the current can pass through the inductor 210 and the switching transistor 110, the current on the inductor 210 increases and some energy is stored; in the discharge stage, the switching transistor 110 is turned off; due to a current retention characteristic of the inductor 210, the current flowing through the inductor 210 does not immediately change 0, but slowly changes from the value at the end of charging to 0, while the original circuit has been opened, so the inductor 210 begins to charge the input capacitor Cin, the voltage of the input capacitor Cin increases; upon the voltage of the input capacitor Cin being higher than the input voltage, after boost is completed, the Schottky diode 220 is turned on, and the current can flow out through the inductor 210 and the Schottky diode 220.

In some examples, the control circuit 130 is further configured to lower the temperature of the driver chip according to the comparison result.

In some examples, the control circuit 130 is configured to supply a gate electrode signal to the gate electrode 110G of the switching transistor 110 through the first connection end 131; and the control circuit 130 is further configured to adjust a duty cycle or a pulse frequency of the gate electrode signal according to the comparison result. Upon it being recognized that the driving current of the driver chip is large, the control circuit 130 can reduce the driving voltage by reducing the duty cycle and the pulse frequency of the gate electrode signal, thereby reducing power consumption and temperature of the driver chip. It should be noted that the higher the driving voltage of the driver chip, the greater the Gap relative to the pixel driving voltage, resulting in higher dissipation power consumption of the driver chip; meanwhile, the driving voltage (AVDD) is a reference voltage of the gamma voltage; upon the driving voltage decreasing, the gamma voltage also decreases, which reduces fluctuation of a grayscale voltage between lines of the display picture, so that overall load of the display apparatus decreases and power consumption of the driver chip also decreases. Therefore, reducing the driving voltage can effectively lower the temperature of the driver chip.

Figure 2:
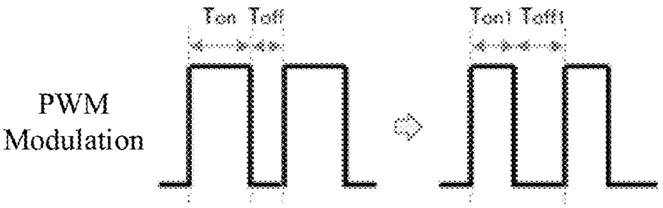
FIG. 2 is a schematic diagram of reducing a driving voltage by reducing a duty cycle of a gate electrode signal provided by an embodiment of the present disclosure.

FIG. 2 is a schematic diagram of reducing a driving voltage by reducing a duty cycle of a gate electrode signal provided by an embodiment of the present disclosure. As illustrated by FIG. 2, a formula of a relationship between the input voltage and the output voltage of the boost circuit is Vout=Vin/(1−Dpwm), where, Vout is the output voltage, Vin is the input voltage, and Dpwm is a waveform duty cycle of the gate electrode signal output by the control circuit to the gate electrode of the switching transistor, and satisfies a common formula Dpwm=Ton/(Ton+Toff). It can be seen that the output voltage Vout is directly proportional to Dpwm, so the output voltage, that is, the driving voltage, can be reduced by reducing the duty cycle, i.e., reducing Ton time and increasing Toff1 time, but maintaining the cycle unchanged, i.e., Ton+Toff=Ton1+Toff1. That is to say, upon the ON time of the switching transistor decreasing, charge time of the input end of the boost circuit or the power supply end to the inductor 210 decreases, resulting in decrease in overall released electrical energy and decrease in the output voltage.

It should be noted that, considering normal operation of the driver chip and normal display of the picture, it is necessary to set an adjustable minimum voltage Vmin of the output voltage Vout, and the voltage corresponds to a settable duty cycle threshold Dmin; that is to say, upon the control circuit turning down the PWM duty cycle Dpwm, DPWM cannot be made less than Dmin.

In some examples, a plurality of tap positions of Dpwm can be set; upon the control circuit determining that the present current exceeds the large current threshold, the Dpwm tap position can be turned down firstly; after a period of stability, if it is determined that the present current still exceeds the large current threshold, the Dpwm tap position can be further turned down until the present current is less than the large current threshold or Dpwm, or Dpwn has been turned down to the Dmin value.

Figure 3:
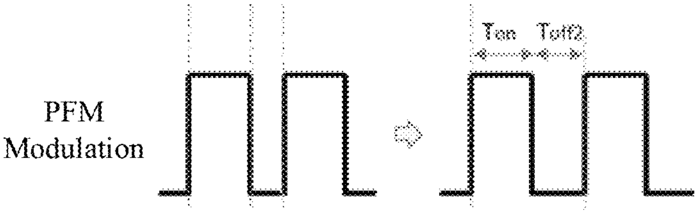
FIG. 3 is a schematic diagram of reducing a driving voltage by reducing a pulse frequency of a gate electrode signal provided by an embodiment of the present disclosure.

FIG. 3 is a schematic diagram of reducing a driving voltage by reducing a pulse frequency of a gate electrode signal provided by an embodiment of the present disclosure. As illustrated by FIG. 3, similarly, a formula of a relationship between the input voltage and the output voltage of the boost circuit is Vout=Vin/(1−Dpwm), where, Vout is the output voltage, Vin is the input voltage, and Dpwm is a waveform duty cycle of the gate electrode signal output by the control circuit to the gate electrode of the switching transistor, and satisfies a formula Dpwm=Ton/(Ton+Toff). It can be seen that the output voltage Vout is directly proportional to Dpwm. At this time, the control circuit can reduce the Dpwm value by reducing the pulse frequency F of the gate electrode signal, that is, maintaining Ton time unchanged, increasing Toff2 time, so that pulse cycle time increases, so the pulse frequency decreases, which can reduce the output voltage. That is to say, as OFF time of the switching transistor increases, discharge time of the boost circuit becomes longer, so an average voltage of the overall released electrical energy decreases, that is, the output voltage decreases.

It should be noted that, considering normal operation of the driver chip and normal display of the picture, it is necessary to set the adjustable minimum voltage Vmin of the output voltage Vout, and the voltage corresponds to the settable pulse frequency threshold Fmin, that is, upon the control circuit turning down the pulse frequency F, the pulse frequency F cannot be less than the pulse frequency threshold Fmin.

In some examples, a plurality of tap positions of F can be set; upon the control circuit determining that the present current exceeds the large current threshold, the F tap position can be turned down firstly; after a period of stability, if it is determined that the present current still exceeds the large current threshold, the F tap position can be further turned down, until the present current is less than the large current threshold or F, or F has been turned down to the Fmin value.

In some examples, as illustrated by FIG. 1, the above-described boost circuit 200 is arranged in the periphery of the power management integrated chip 300 (PMIC). In such case, the switching transistor 110, the comparison circuit 120 and the control circuit 130 of the above-described temperature control circuit 100 can be all integrated into the power management integrated chip 300; then, the second node N2 of the temperature control circuit can be connected with the first node N1 of the boost circuit 200 through the I2C interface.

Figure 4:
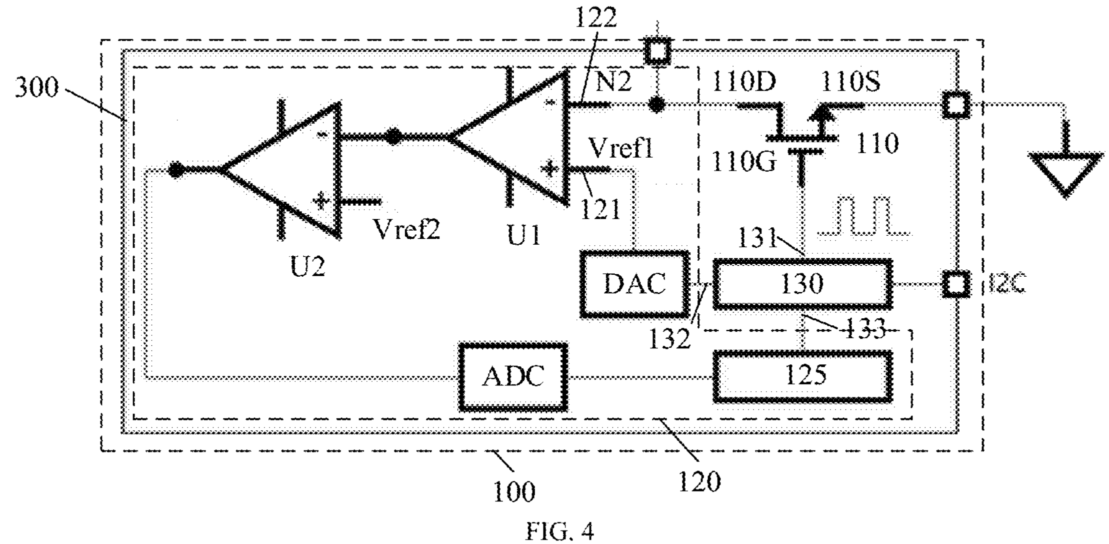
FIG. 4 is a schematic diagram of a power management integrated chip provided by an embodiment of the present disclosure.

Corresponding to the temperature control circuit shown in FIG. 1, an embodiment of the present disclosure further provides a power management integrated chip. FIG. 4 is a schematic diagram of a power management integrated chip provided by an embodiment of the present disclosure; as illustrated by FIG. 4, the power management integrated chip 300 includes the above-described boost circuit 100.

Figure 5:
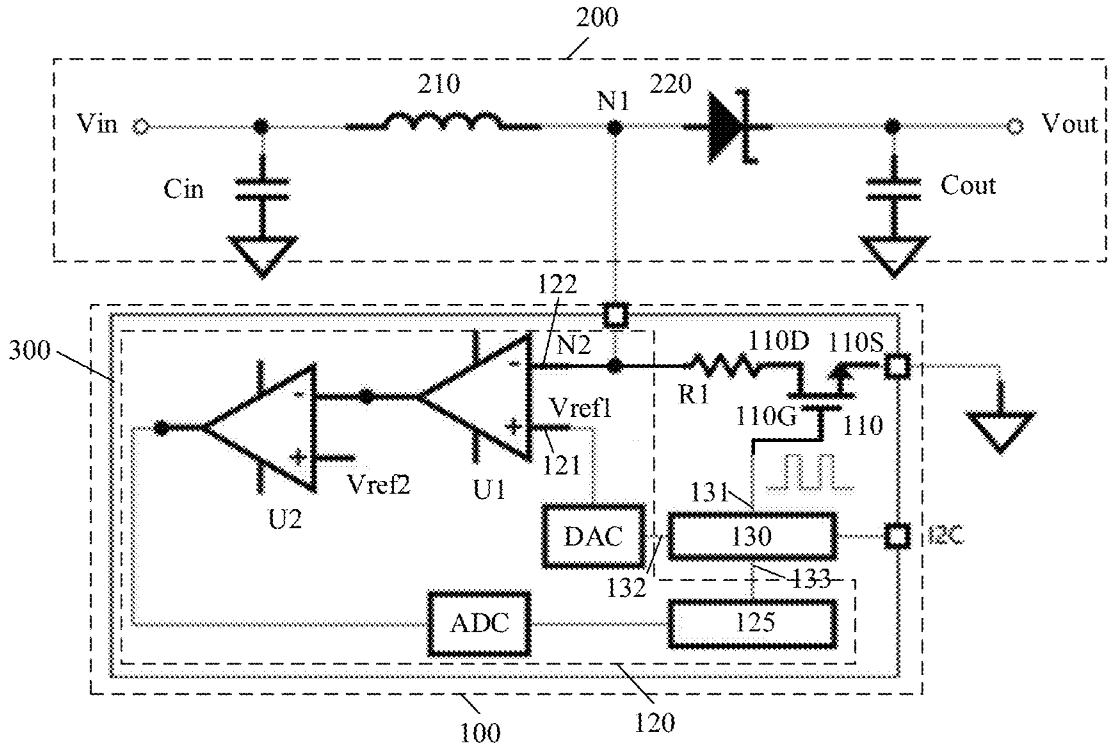
FIG. 5 is a schematic diagram of a temperature control circuit of another driver chip provided by an embodiment of the present disclosure.

An embodiment of the present disclosure further provides another temperature control circuit of a driver chip. FIG. 5 is a schematic diagram of a temperature control circuit of another driver chip provided by an embodiment of the present disclosure.

As illustrated by FIG. 5, the temperature control circuit 100 of the driver chip includes a switching transistor 110, a comparison circuit 120 and a control circuit 130; the switching transistor 110 includes a gate electrode 110G, a first electrode 110D and a second electrode 110S; the comparison circuit 120 includes a first comparison end 121 and a second comparison end 122; and the control circuit 130 includes a first connection end 131, a second connection end 132 and a third connection end 133. The first connection end 131 is electrically connected with the gate electrode 110G of the switching transistor 110, the second connection end 132 is electrically connected with the first comparison end 121, and the third connection end 133 is electrically connected with the output end of the comparison circuit 120; the first electrode 110D of the switching transistor 110 is connected with a first node N1 located between an inductor 210 of a boost circuit 200 and a Schottky diode 220, the second comparison end 122 and the first electrode 110D of the switching transistor 110 are connected to a second node N2, the boost circuit 200 is configured to supply a driving voltage to the driver chip; the control circuit 130 is configured to output a first reference voltage Vref1 to the comparison circuit 120 through the second connection end 132, the comparison circuit 120 is configured to compare a magnitude relationship between a voltage on the second comparison end 122 and the first reference voltage Vref1 and output a comparison result; and the control circuit 130 acquires the comparison result through the third connection end 133 and determines whether an output current on the boost circuit 200 is excessively large according to the comparison result.

Different from the temperature control circuit shown in FIG. 1, the temperature control circuit 100 shown in FIG. 5 further includes a first resistor R1, located between the first electrode 110D of the switching transistor 110 and the second node N2. Thus, the temperature control circuit 100 can avoid the problem of an unstable voltage on the second node N2 caused by small internal resistance of the switching transistor 110 by setting the first resistor R1 between the first electrode 110D of the switching transistor 110 and the second node N2, and can also avoid the problem of great voltage differences on the second node N2 caused by the great differences in internal resistance of the switching transistor 110 of different products.

Similarly, the temperature control circuit can determine whether the present driving current exceeds the large current threshold, by presetting the first reference voltage that reflects the large current threshold of the driving current, and then using the comparison circuit to compare whether the voltage on the second node is higher than the first reference voltage, so as to determine whether the driver chip needs to be cooled; and then lower the temperature of the driver chip through a series of cooling modes, so as to avoid burning the driver chip.

For example, a resistance value of the first resistor R1 can range from 0.001Ω to 1Ω. Thus, by setting the resistance value of the first resistor R1 to satisfy the above range, the temperature control circuit can effectively avoid the problem of an unstable voltage at the second node caused by small internal resistance of the switching transistor, and also avoid the problem of great voltage differences at the second node caused by great differences in internal resistance of the switching transistors of different products. On the other hand, the temperature control circuit can also reduce the heating problem of the temperature control circuit through the above-described resistance value.

In some examples, as illustrated by FIG. 5, the second electrode 110S of the switching transistor 110 is grounded; one end of the first resistor R1 and the second comparison end 122 are connected to the second node N2; and the other end of the first resistor R1 is connected with the first electrode 110D of the switching transistor 110. Thus, upon the boost circuit 200 being in the charge stage, the current can pass through the first resistor R1 and the switching transistor 110, and charge the inductor 210. In such case, the source-drain current threshold in a position of the second node N2 can be determined according to the large current threshold, and then the source-drain current threshold can be directly multiplied by the resistance value of the first resistor R1, to obtain the above-described first reference voltage Vref1; during an operation process of the temperature control circuit, a magnitude relationship between the voltage on the voltage on the second node N2 and the first reference voltage Vref1 can be compared through the comparison circuit 120, to determine whether the present driving current exceeds the large current threshold, so as to determine whether the driver chip needs to be cooled.

In some examples, as illustrated by FIG. 5, the comparison circuit 120 includes a first operational amplifier U1, which includes a first input end, a second input end, an output end, a first power input end and a second power input end; the first input end is the first comparison end 121, the second input end is the second comparison end 122, the first power input end is connected with a first positive voltage, and the second power input end is connected with a negative voltage. Thus, the first operational amplifier U1 can compare a magnitude relationship of voltages on the first comparison end 121 and the second comparison end 122. Upon the voltage of the first comparison end 121 being greater than the voltage of the second comparison end 122, the voltage on the output end is a positive voltage; that is to say, upon the first reference voltage Vref1 being greater than the voltage on the second node N2, the voltage on the output end is a positive voltage; upon the voltage of the first comparison end 121 being less than the voltage of the second comparison end 122, the voltage on the output end is a negative voltage; that is to say, upon the first reference voltage Vref1 being less than the voltage on the second node N2, the voltage on the output end is a negative voltage.

In some examples, as illustrated by FIG. 5, the comparison circuit 120 further includes a second operational amplifier U2, which includes a first input end, a second input end, an output end, a first power input end and a second power input end; the first input end is connected with a 0V voltage or a second reference voltage less than the first reference voltage Vref1, the second input end is connected with the output end of the first operational amplifier U1, the first power input end is connected with a second positive voltage, and the second power input end is connected with a 0V voltage. At this time, upon the voltage on the output end of the first operational amplifier U1 being a negative voltage, the output end of the second operational amplifier U2 is a positive voltage; upon the voltage on the output end of the first operational amplifier U1 being a positive voltage, the output end of the second operational amplifier U2 is a 0V voltage. Thus, the second operational amplifier U2 can act as an inverter, converting the voltage on the output end of the first operational amplifier U1 into a positive voltage.

In some examples, as illustrated by FIG. 5, the comparison circuit 120 further includes a register 125, a digital-to-analog converter DAC and an analog-to-digital converter ADC; the register 125 includes an input end and an output end; the digital-to-analog converter DAC includes an input end and an output end; the analog-to-digital converter ADC includes an input end and an output end; the input end of the digital-to-analog converter DAC is connected with the second connection end 132, and the output end of the digital-to-analog converter DAC is connected with the second comparison end 122; the input end of the analog-to-digital converter ADC is connected with the output end of the second operational amplifier U2, the output end of the analog-to-digital converter ADC is connected with the input end of the register 125, and the output end of the register 125 is connected with the third connection end 133. Thus, the comparison circuit 120 can convert a digital signal output by the control circuit 130 into an analog signal, that is, the first reference voltage Vref1, through the digital-to-analog converter, to facilitate comparison by the first operational amplifier U1; and convert the analog signal on the output end of the second operational amplifier U2 into a digital signal through the analog-to-digital converter and transmit the same to the register 125.

It should be noted that the above-described analog-to-digital converter is an electronic element or circuit that converts an analog signal into a digital signal; the above-described digital-to-analog converter is an electronic element or circuit that converts a digital signal into an analog signal; the above-described register can store a binary code, which can be stored as 1 upon the voltage on the output end of the second operational amplifier being a positive voltage, and can be stored as 0 upon the voltage on the output end of the second operational amplifier being a 0V voltage.

In some examples, as illustrated by FIG. 5, the above-described boost circuit 200 includes an input capacitor Cin, an inductor 210, a Schottky diode 220 and an output capacitor Cout; one end of the input capacitor Cin is connected with the input end of the boost circuit 200; the inductor 210 has one end connected with the input end of the boost circuit 200, and the other end connected to the first node N1; and the Schottky diode 220 has one end connected with the first node N1, and the other end connected with the output end of the boost circuit 200. Thus, in the charge stage, the switching transistor 110 is turned on, the voltage of the first node N1 is less than the voltage at the output end of the boost circuit 200, the Schottky diode 220 is turned off, the current can pass through the inductor 210 and the switching transistor 110, the current on the inductor 210 increases and some energy is stored; in the discharge stage, the switching transistor 110 is turned off; due to a current retention characteristic of the inductor 210, the current flowing through the inductor 210 does not immediately change to 0, but slowly changes from the value at the end of charging to 0, while the original circuit has been opened, so the inductor 210 begins to charge the input capacitor Cin, the voltage of the input capacitor Cin increases; upon the voltage of the input capacitor Cin being higher than the input voltage, after boost is completed, the Schottky diode 220 is turned on, and the current can flow out through the inductor 210 and the Schottky diode 220.

In some examples, the control circuit 130 is further configured to lower the temperature of the driver chip according to the comparison result. For example, the control circuit 130 is further configured to adjust the duty cycle or the pulse frequency of the gate electrode signal according to the comparison result to lower the temperature of the driver chip. It should be noted that the relevant description of FIG. 2 and FIG. 3 can be referred to for the above-described mode of lowering the temperature of the driver chip by adjusting the duty cycle or the pulse frequency of the gate electrode signal.

In some examples, as illustrated by FIG. 5, the above-described boost circuit 200 is arranged in the periphery of the power management integrated chip 300. In such case, the switching transistor 110, the comparison circuit 120, the control circuit 130 and first resistor R1 of the above-described temperature control circuit 100 can all be integrated into the power management integrated chip 300; and then, the second node N2 of the temperature control circuit can be connected with the first node N1 of the boost circuit 200 through the I2C interface.

Figure 6:
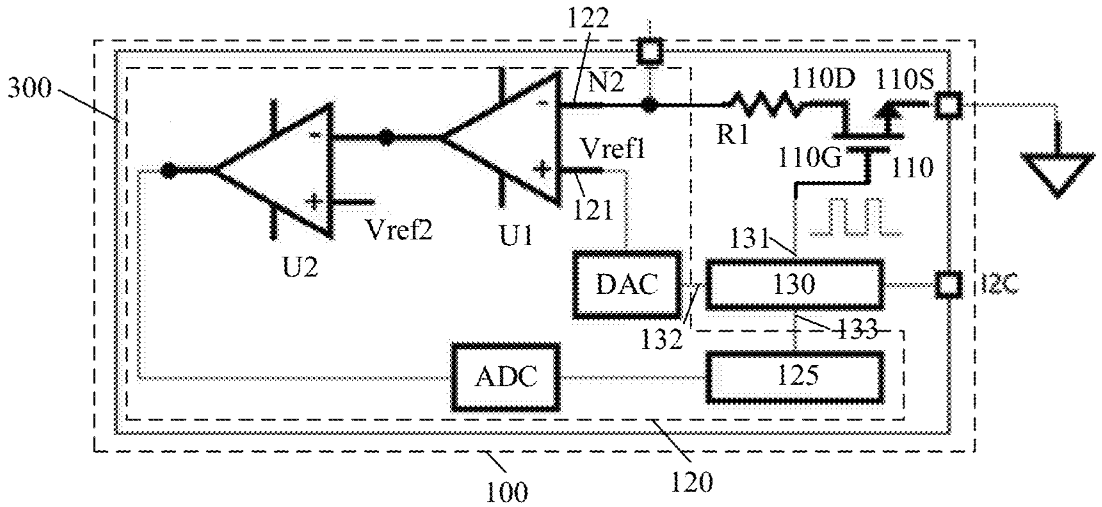
FIG. 6 is a schematic diagram of a power management integrated chip provided by an embodiment of the present disclosure.

Corresponding to the temperature control circuit shown in FIG. 5, an embodiment of the present disclosure further provides a power management integrated chip 300. FIG. 6 is a schematic diagram of a power management integrated chip provided by an embodiment of the present disclosure. As illustrated by FIG. 6, the power management integrated chip 300 includes the above-described boost circuit 100.

Figure 7:
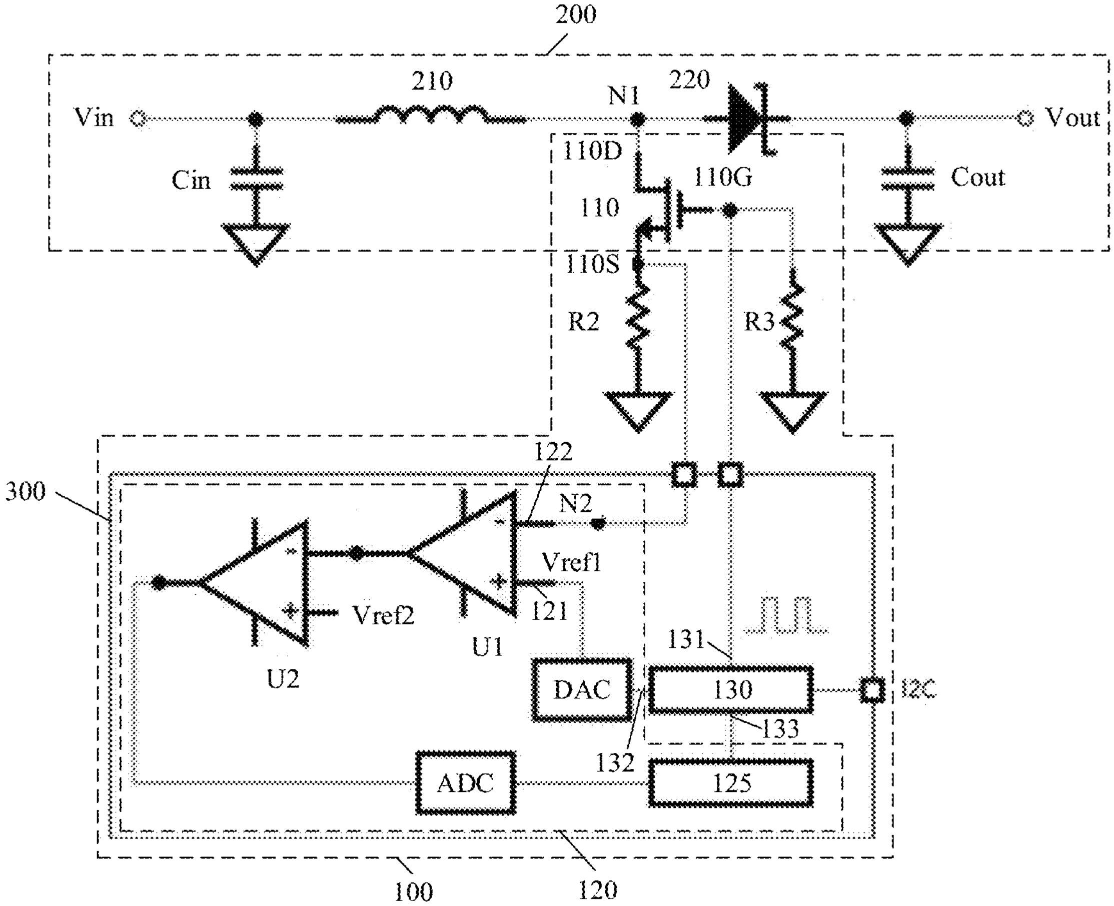
FIG. 7 is a schematic diagram of a temperature control circuit of another driver chip provided by an embodiment of the present disclosure.

An embodiment of the present disclosure further provides a temperature control circuit of a driver chip. FIG. 7 is a schematic diagram of a temperature control circuit of another driver chip provided by an embodiment of the present disclosure.

As illustrated by FIG. 7, the temperature control circuit 100 of the driver chip includes a switching transistor 110, a comparison circuit 120 and a control circuit 130; the switching transistor 110 includes a gate electrode 110G, a first electrode 110D and a second electrode 110S; the comparison circuit 120 includes a first comparison end 121 and a second comparison end 122; the control circuit 130 includes a first connection end 131, a second connection end 132 and a third connection end 133. The first connection end 131 is electrically connected with the gate electrode 110G of the switching transistor 110, the second connection end 132 is electrically connected with the first comparison end 121, and the third connection end 133 is electrically connected with an output end of the comparison circuit 120; the first electrode 110D of the switching transistor 110 is connected with a first node N1 located between an inductor 210 of a boost circuit 200 and a Schottky diode 220, the second comparison end 122 and the second electrode 110S of the switching transistor 110 are connected to a second node N2; the boost circuit 200 is configured to supply a driving voltage to the driver chip; the control circuit 130 is configured to output a first reference voltage Vref1 to the comparison circuit 120 through the second connection end 132, the comparison circuit 120 is configured to compare a magnitude relationship between a voltage on the second comparison end 122 and the first reference voltage Vref1 and output a comparison result; and the control circuit 130 acquires the comparison result through the third connection end 133 and determines whether an output current on the boost circuit 200 is excessively large according to the comparison result.

Different from the temperature control circuit shown in FIG. 1, the temperature control circuit shown in FIG. 7 further includes a second resistor R2, which includes a first end and a second end; the second comparison end 122, the second electrode 110S of the switching transistor 110, and the first end of the second resistor R2 are connected to the second node N2; and the second end of the second resistor R2 is grounded. Upon the boost circuit 200 being in the charge stage, the current can flow through the switching transistor 110 and the second resistor R2, and charge the inductor 210. In such case, the source-drain current threshold in a position of the second node N2 can be determined according to the large current threshold, and then the source-drain current threshold can be directly multiplied by the resistance value of the second resistor R2, to obtain the above-described first reference voltage Vref1; during an operation process of the temperature control circuit, the comparison circuit can compare a magnitude relationship between the voltage on the second node N2 and the first reference voltage Vref1 to determine whether the present driving current exceeds the large current threshold, so as to determine whether the driver chip needs to be cooled. Thus, the temperature control circuit can avoid the problem of an unstable voltage on the second node N2 caused by small internal resistance of the switching transistor 110 by setting the second resistor R2, and can also avoid the problem of great voltage differences on the second node N2 caused by great differences in internal resistance of the switching transistor 110 of different products.

Similarly, the temperature control circuit can determine whether the present driving current exceeds the large current threshold, by presetting the first reference voltage that reflects the large current threshold of the driving current, and then using the comparison circuit to compare whether the voltage on the second node N2 is higher than the first reference voltage, so as to determine whether the driver chip needs to be cooled; and then lower the temperature of the driver chip through a series of cooling modes, so as to avoid burning the driver chip.

For example, a resistance value of the second resistor R2 can range from 0.001 Ω to 1Ω. Thus, by setting the resistance value of the second resistor R2 to satisfy the above range, the temperature control circuit can effectively avoid the problem of an unstable voltage at the second node caused by small internal resistance of the switching transistor, and also avoid the problem of great voltage differences at the second node caused by great differences in internal resistance of the switching transistors of different products. On the other hand, the temperature control circuit can also reduce the heating problem of the temperature control circuit through the above-described resistance value.

In some examples, as illustrated by FIG. 7, the temperature control circuit 100 further includes a third resistor R3, which includes a first end and a second end; the first end of the third resistor R3 is connected with the gate electrode 110G of the switching transistor 110, and the second end of the third resistor R3 is grounded. Thus, the temperature control circuit can fix resistance of a gate electrode potential of the switching transistor 110 through the third resistor R3, improve anti-interference capability of the gate electrode, and ensure that the gate electrode can be turned on and off normally.

For example, the resistance value of the third resistor R3 can range from 1 KΩ to 100 KΩ. By ensuring that the resistance value of the third resistor R3 satisfies the above range, the temperature control circuit can effectively fix resistance of the gate electrode potential of the switching transistor, improve anti-interference capability of the gate electrode, and ensure that the gate electrode can be turned on and off normally.

In some examples, as illustrated by FIG. 7, the comparison circuit 120 includes a first operational amplifier U1, which includes a first input end, a second input end, an output end, a first power input end and a second power input end; the first input end is the first comparison end 121, the second input end is the second comparison end 122, the first power input end is connected with a first positive voltage, and the second power input end is connected with a negative voltage. Thus, the first operational amplifier U1 can compare a magnitude relationship of voltages on the first comparison end 121 and the second comparison end 122. Upon the voltage of the first comparison end 121 being greater than the voltage of the second comparison end 122, the voltage on the output end is a positive voltage; that is to say, upon the first reference voltage Vref1 being greater than the voltage on the second node N2, the voltage on the output end is a positive voltage; upon the voltage of the first comparison end 121 being less than the voltage of the second comparison end 122, the voltage on the output end is a negative voltage; that is to say, upon the first reference voltage Vref1 being less than the voltage on the second node N2, the voltage on the output end is a negative voltage.

In some examples, as illustrated by FIG. 7, the comparison circuit 120 further includes a second operational amplifier U2, which includes a first input end, a second input end, an output end, a first power input end and a second power input end; the first input end is connected with a 0V voltage or a second reference voltage less than the first reference voltage Vref1, the second input end is connected with the output end of the first operational amplifier U1, the first power input end is connected with a second positive voltage, and the second power input end is connected with a 0V voltage. At this time, upon the voltage on the output end of the first operational amplifier U1 being a negative voltage, the output end of the second operational amplifier U2 is a positive voltage; upon the voltage on the output end of the first operational amplifier U1 being a positive voltage, the output end of the second operational amplifier U2 is a 0V voltage. Thus, the second operational amplifier U2 can act as an inverter, converting the voltage on the output end of the first operational amplifier U1 into a positive voltage.

In some examples, as illustrated by FIG. 7, the comparison circuit 120 further includes a register 125, a digital-to-analog converter DAC and an analog-to-digital converter ADC; the register 125 includes an input end and an output end; the digital-to-analog converter DAC includes an input end and an output end; the analog-to-digital converter ADC includes an input end and an output end; the input end of the digital-to-analog converter DAC is connected with the second connection end 132, and the output end of the digital-to-analog converter DAC is connected with the second comparison end 122; the input end of the analog-to-digital converter ADC is connected with the output end of the second operational amplifier U2, the output end of the analog-to-digital converter ADC is connected with the input end of the register 125, and the output end of the register 125 is connected with the third connection end 133. Thus, the comparison circuit 120 can convert a digital signal output by the control circuit 130 into an analog signal, that is, the first reference voltage Vref1, through the digital-to-analog converter, to facilitate comparison by the first operational amplifier U1; and convert the analog signal on the output end of the second operational amplifier U2 into a digital signal through the analog-to-digital converter and transmit the same to the register 125.

It should be noted that the above-described analog-to-digital converter is an electronic element or circuit that converts an analog signal into a digital signal; the above-described digital-to-analog converter is an electronic element or circuit that converts a digital signal into an analog signal; the above-described register can store a binary code, which can be stored as 1 upon the voltage on the output end of the second operational amplifier being a positive voltage, and can be stored as 0 upon the voltage on the output end of the second operational amplifier being a 0V voltage.

In some examples, as illustrated by FIG. 7, the above-described boost circuit 200 includes an input capacitor Cin, an inductor 210, a Schottky diode 220 and an output capacitor Cout; one end of the input capacitor Cin is connected with the input end of the boost circuit 200; the inductor 210 has one end connected with the input end of the boost circuit 200, and the other end connected to the first node N1; and the Schottky diode 220 has one end connected with the first node N1, and the other end connected with the output end of the boost circuit 200. Thus, in the charge stage, the switching transistor 110 is turned on, the voltage of the first node N1 is less than the voltage at the output end of the boost circuit 200, the Schottky diode 220 is turned off, the current can pass through the inductor 210 and the switching transistor 110, the current on the inductor 210 increases and some energy is stored; in the discharge stage, the switching transistor 110 is turned off; due to a current retention characteristic of the inductor 210, the current flowing through the inductor 210 does not immediately change to 0, but slowly changes from the value at the end of charging to 0, while the original circuit has been opened, so the inductor 210 begins to charge the input capacitor Cin, the voltage of the input capacitor Cin increases; upon the voltage of the input capacitor Cin being higher than the input voltage, after boost is completed, the Schottky diode 220 is turned on, and the current can flow out through the inductor 210 and the Schottky diode 220.

In some examples, an inductance value of the above-described inductor 210 ranges from 1 μH to 20 μH. Thus, the boost circuit can better store energy; a capacitance value of the above-described input capacitor Cin ranges from 10 μF to 40 μF, while a capacitance value of the above-described output capacitor Cout ranges from 20 μF to 100 μF. Thus, the input capacitor and the output capacitor have better charge and discharge performance.

In some examples, the control circuit 130 is further configured to lower the temperature of the driver chip according to the comparison result. For example, the control circuit 130 is further configured to adjust the duty cycle or the pulse frequency of the gate electrode signal according to the comparison result to lower the temperature of the driver chip. It should be noted that the relevant description of FIG. 2 and FIG. 3 can be referred to for the above-described mode of lowering the temperature of the driver chip by adjusting the duty cycle or the pulse frequency of the gate electrode signal.

In some examples, as illustrated by FIG. 7, the above-described boost circuit 200 is arranged in the periphery of the power management integrated chip 300. In such case, the comparison circuit 120 and the control circuit 130 of the above-described temperature control circuit 100 can be integrated into the power management integrated chip 300; and then, the switching transistor 110, the second resistor R2 and the third resistor of the above-described temperature control circuit can be arranged in the periphery of the power management integrated chip 300.

Corresponding to the temperature control circuit shown in FIG. 7, an embodiment of the present disclosure further provides a power management integrated chip. FIG. 8 is a schematic diagram of a power management integrated chip provided by an embodiment of the present disclosure; as illustrated by FIG. 8, the power management integrated chip 300 includes the above-described boost circuit 100.

An embodiment of the present disclosure further provides a timing control driver board. FIG. 9 is a schematic diagram of a timing control driver board provided by an embodiment of the present disclosure. As illustrated by FIG. 9, the timing control driver board 400 includes a boost circuit 200 and a temperature control circuit 100 provided by any one of the above-described examples. Thus, the timing control driver board 400 can use a comparison circuit to compare whether the voltage on the second node N2 is greater than the first reference voltage Vref1, to determine whether the present driving current exceeds the large current threshold, so as to determine whether the driver chip needs to be cooled; and then lower the temperature of the driver chip through a series of cooling modes, so as to avoid burning the driver chip.

In some examples, as illustrated by FIG. 9, the timing control driver board 400 further includes a power management integrated chip 300; and the comparison circuit 120 and the control circuit 130 in the temperature control circuit 100 are integrated into the power management integrated chip 300.

In some examples, as illustrated by FIG. 9, the switching transistor 110 in the temperature control circuit is integrated into the power management integrated chip 300. Of course, the embodiments of the present disclosure include, but are not limited thereto; and the switching transistor 110 in the temperature control circuit can also be arranged outside the power integrated chip. It should be noted that FIG. 9 shows two states of the switching transistor 110, that is, the switching transistor 110 can not only be integrated into the power management integrated chip 300, but can also be arranged on the periphery of the power management integrated chip 300.

In some examples, FIG. 1 can be referred to for a specific structure of the boost circuit 200; the above-described boost circuit 200 includes an input capacitor Cin, an inductor 210, a Schottky diode 220 and an output capacitor Cout; one end of the input capacitor Cin is connected with the input end of the boost circuit 200; the inductor 210 has one end connected with the input end of the boost circuit 200, and the other end connected to the first node N1; and the Schottky diode 220 has one end connected with the first node N1, and the other end connected with the output end of the boost circuit 200. Thus, in the charge stage, the switching transistor 110 is turned on, the voltage of the first node N1 is less than the voltage at the output end of the boost circuit 200, the Schottky diode 220 is turned off, the current can pass through the inductor 210 and the switching transistor 110, the current on the inductor 210 increases and some energy is stored; in the discharge stage, the switching transistor 110 is turned off; due to a current retention characteristic of the inductor 210, the current flowing through the inductor 210 does not immediately change to 0, but slowly changes from the value at the end of charging to 0, while the original circuit has been opened, so the inductor 210 begins to charge the input capacitor Cin, the voltage of the input capacitor Cin increases; upon the voltage of the input capacitor Cin being higher than the input voltage, after boost is completed, the Schottky diode 220 is turned on, and the current can flow out through the inductor 210 and the Schottky diode 220.

In some examples, as illustrated by FIG. 9, the timing control driver board 400 includes a timing control chip 410, which can include a micro-control unit 411 and an accurate color-temperature adjusting unit 412; the accurate color-temperature adjusting unit 412 is configured to adjust a grayscale of a display picture; the micro-control unit 411 is respectively in communicative connection with the control circuit 130 and the accurate color-temperature adjusting unit 412; the micro-control unit 411 is configured to reduce the grayscale of the display picture according to the comparison result 130 through the accurate color-temperature adjusting unit 412.

FIG. 10 shows a charge and discharge comparison table of different grayscales provided by an embodiment of the present disclosure. As illustrated by FIG. 10, a first display lookup table (LUT1) is an Accurate Color-temperature Correction table (ACC table) for regular display, for example, upon displaying a 253 grayscale, it is a 12-bit 4048 scale actually displayed; while a second display lookup table (LUT2) is an Accurate Color-temperature Correction table (ACC table) after scaling down, that is, upon displaying a 253 grayscale, it is a 12-bit 3568 scale actually displayed. Therefore, upon the micro-control unit recognizing the comparison result, for example, upon a stored value on the register being 1, the micro-control unit is configured to switch from LUT1 to LUT2 through the accurate color-temperature adjusting unit, so as to reduce the grayscale of the display picture.

Figure 11:
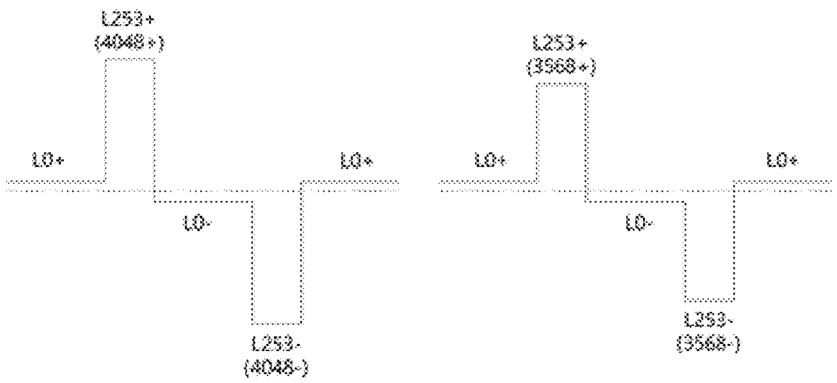
FIG. 11 is a charge comparison diagram of pixel units provided by an embodiment of the present disclosure.

After the grayscale of the actual realistic picture decreases, a voltage fluctuation range of pixel unit charge and discharge decreases upon the displayed lines having different grayscales. FIG. 11 is a charge comparison diagram of pixel units provided by an embodiment of the present disclosure. As illustrated by FIG. 11, the pixel voltage corresponds to the grayscale; upon the pixel unit being charged from L0 to L253, an actual charge grayscale of the first display lookup table (LUT1) is 4048 positive polarity, while an actual charge grayscale of the second display lookup table (LUT2) is 3568 positive polarity. It can be seen that voltage fluctuation of the second display lookup table (LUT2) is significantly smaller than fluctuation of the first display lookup table (LUT1), so overall load of the display apparatus is reduced; because the load of the display apparatus is supplied by the driver chip, power consumption of the driver chip can be ultimately reduced, so that power consumption of the driver chip can be reduced.

In some examples, as illustrated by FIG. 9, the timing control chip 410 further includes a polarity reversing unit 413, which is in communicative connection with the micro-control unit 411; the micro-control unit 411 is configured to reduce the times of polarity reversal of the display picture through the polarity reversing unit 413 according to the comparison result, which, thus, can also reduce the load of the display apparatus, to reduce power consumption of the driver chip, and further lower the temperature of the driver chip.

Figure 12:
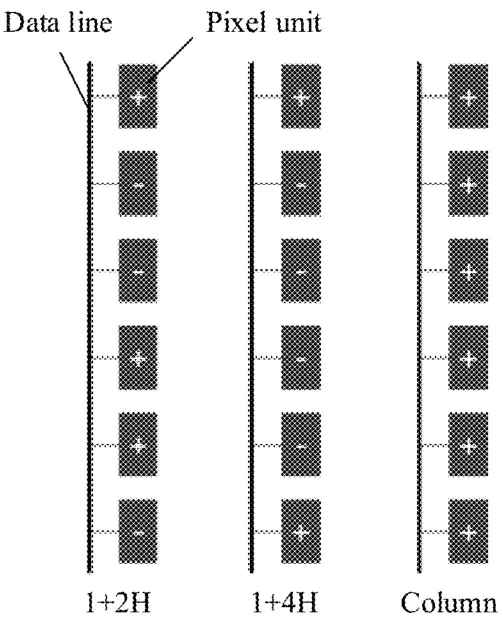
FIG. 12 is a schematic diagram of pixel polarity comparison provided by an embodiment of the present disclosure.

FIG. 12 is a schematic diagram of pixel polarity comparison provided by an embodiment of the present disclosure. As illustrated by FIG. 12, in order to eliminate the afterimage problem of long-term direct-current bias voltage in liquid crystals, polarity reversal modes such as 1+2H polarity reversal or 1+4H polarity reversal can be adopted for a same data line; 1+2H polarity reversal refers to performing polarity reversal once for every two pixel units, and 1+4H polarity reversal refers to performing polarity reversal once for every four pixel units; the Column driving mode shown in FIG. 12 represents performing no polarity reversal. With respect to a same data line, the more times the polarity reversal is performed, the more intense the charge and discharge fluctuation of the pixel unit, so, power consumption of 1+2H polarity reversal is higher than power consumption of 1+4H polarity reversal. Therefore, the micro-control unit can reduce the times of polarity reversal of the display picture through the polarity reversing unit, for example, switching from 1+2H polarity reversal to 1+4H polarity reversal or the Column driving mode, which, thus, can also reduce the load of the display apparatus, to reduce power consumption of the driver chip, and further lower the temperature of the driver chip.

In some examples, as illustrated by FIG. 9, the timing control chip 410 further includes a frequency-variable refreshing unit 414, which is in communicative connection with the micro-control unit 411; the micro-control unit 411 is configured to reduce a refresh frequency of the display picture according to the comparison result through the frequency-variable refreshing unit 414, which, thus, can also reduce power consumption of the driver chip, so as to lower the temperature of the driver chip.

Figure 13A:
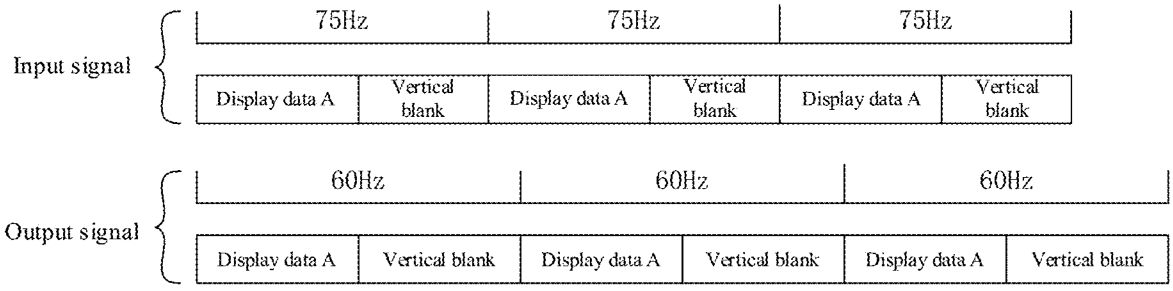
FIG. 13A is a schematic diagram of a method for reducing a refresh frequency provided by an embodiment of the present disclosure.
Figure 13B:
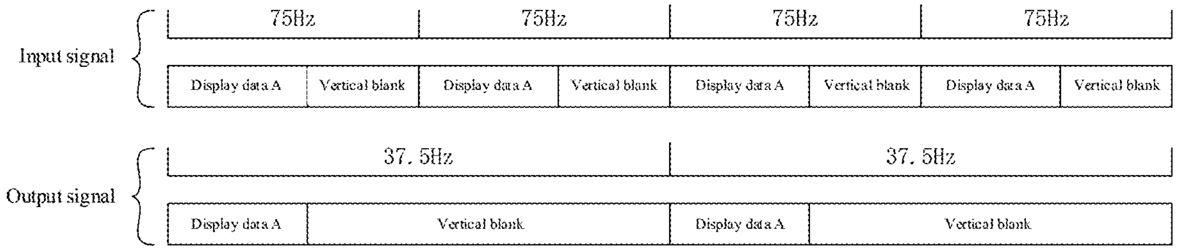
FIG. 13B is a schematic diagram of another method for reducing a refresh frequency provided by an embodiment of the present disclosure.

FIG. 13A is a schematic diagram of a method for reducing a refresh frequency provided by an embodiment of the present disclosure; and FIG. 13B is a schematic diagram of another method for reducing a refresh frequency provided by an embodiment of the present disclosure. As illustrated by FIG. 13A, an input 75-Hz refresh frequency can be reduced to a 60-Hz refresh frequency by increasing vertical blank time; the load of the display apparatus can be roughly estimated to have decreased by $(75-60)/75*100\%=20\%$; if it is reduced from a higher frequency to a lower frequency, a reduction proportion of power consumption will be higher. Thus, power consumption of the driver chip also decreases, which also lowers the temperature of the driver chip. As illustrated by FIG. 13B, the micro-control unit can also directly control clipping data of an odd frame or an even frame, and a frequency of output data can be directly halved; or, the micro-control unit can also control clipping one frame of data every N frames, and then an output frequency will change to $(N-1)/N$ of the original frequency, which, thus, can also reduce the load on the display apparatus, so as to lower the temperature of the driver chip.

In some examples, as illustrated by FIG. 9, the timing control driver board 400 further includes a programmable gamma chip 420; the programmable gamma chip 420 includes: a controller 421, which is in communicative connection with the micro-control unit 411; a first gamma voltage bank A (BankA), which is in communicative connection with the controller 421; a second gamma voltage bank B (BankB), which is in communicative connection with the controller, and the micro-control unit is configured to switch between the first gamma voltage bank A and the second gamma voltage bank B through the controller according to the comparison result; and with respect to a same grayscale, a gamma voltage in the second gamma voltage bank B is less than a gamma voltage in the first gamma voltage bank A. Thus, the micro-control unit can also reduce power of the driver chip by reducing the gamma voltage, so as to lower the temperature of the driver chip.

Figure 14:
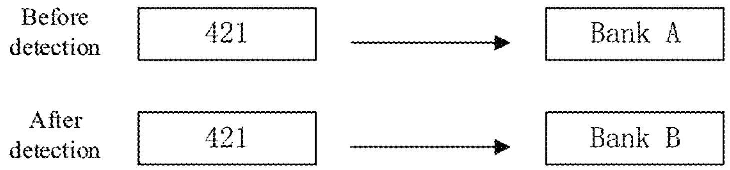
FIG. 14 is a schematic diagram of a gamma voltage bank selection provided by an embodiment of the present disclosure.

FIG. 14 is a schematic diagram of a gamma voltage bank selection provided by an embodiment of the present disclosure. As illustrated by FIG. 9 and FIG. 14, the programmable gamma chip includes a first gamma voltage bank A and a second gamma voltage bank B, which respectively store different gamma voltages; the controller can select one of the first gamma voltage bank A and the second gamma voltage bank B for output. The second gamma voltage bank B is a preset group of gamma voltages that are lower than the voltage of the first gamma voltage bank A; and because gamma voltages corresponding to all the grayscales are all lower than the gamma voltages in the first gamma voltage bank A, upon switching to the second gamma voltage bank B, the load on the display apparatus is also smaller, thereby lowering the temperature of the driver chip.

In some examples, the control circuit, the micro-control unit and the controller as described above can include a storage medium and a processing circuit; wherein, the storage medium, is configured to store computer programs; and the processing circuit is configured to execute the computer programs in the storage medium to implement various control operations.

In some examples, the above-described storage medium can be a volatile memory and/or a non-volatile memory. The volatile memory can include, for example, a Random Access Memory (RAM) and/or a cache. The non-volatile memory can include, for example, a Read-Only Memory (ROM), a hard disk, a flash memory, etc.

Figure 15:
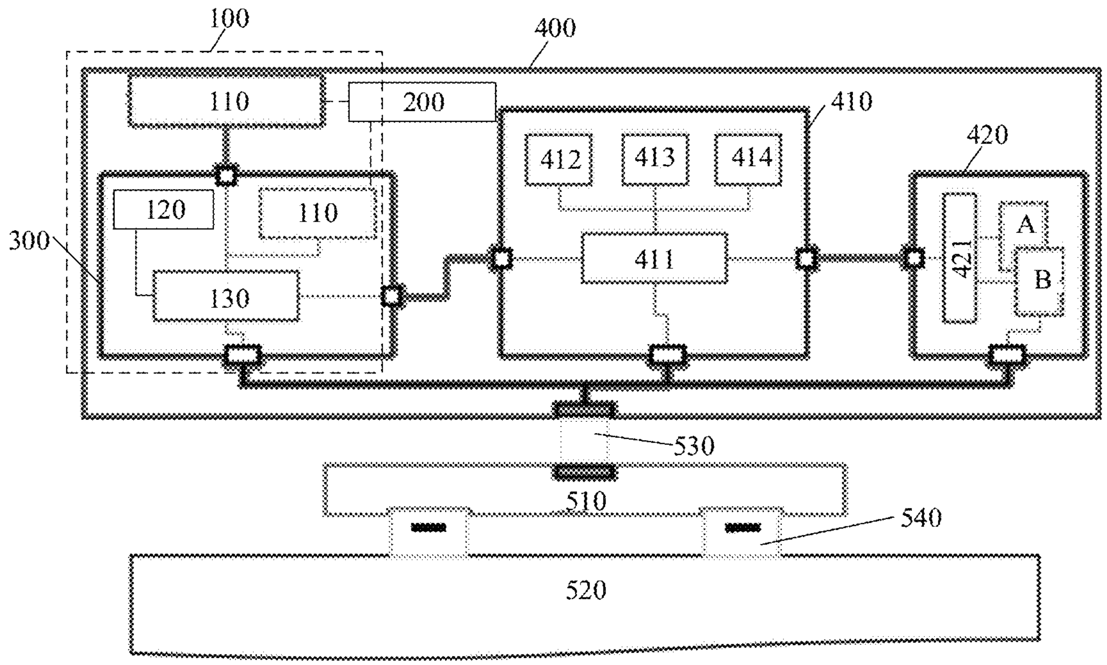
FIG. 15 is a schematic diagram of a display apparatus provided by an embodiment of the present disclosure.

FIG. 15 is a schematic diagram of a display apparatus provided by an embodiment of the present disclosure. As illustrated by FIG. 15, the display apparatus 500 includes the above-described timing control driver board 400. Thus, the display apparatus can effectively avoid the problem of burning the driver chip due to an excessively high temperature.

In some examples, as illustrated by FIG. 15, the display apparatus 500 further includes a circuit board 510, a driver chip 540 and a display panel 520. The timing control driver board 400 is connected with the circuit board 510 through a flexible printed circuit 530; and the driver chip 540 (which can be a Chip On Film (COF)) can have one end connected with the circuit board 510, and the other end connected with the display panel 520.

In some examples, the above-described display apparatus is a product of a large size, a high refresh frequency, and a high resolution. For example, the resolution of the display apparatus is greater than 4K; and the refresh frequency of the display apparatus is greater than 120 Hz.

For example, the display apparatus can be a television, a monitor, an electronic picture frame, a digital photo frame, a navigator, a laptop, a tablet personal computer, a smart phone, and any other electronic product having a display function.

Figure 16:
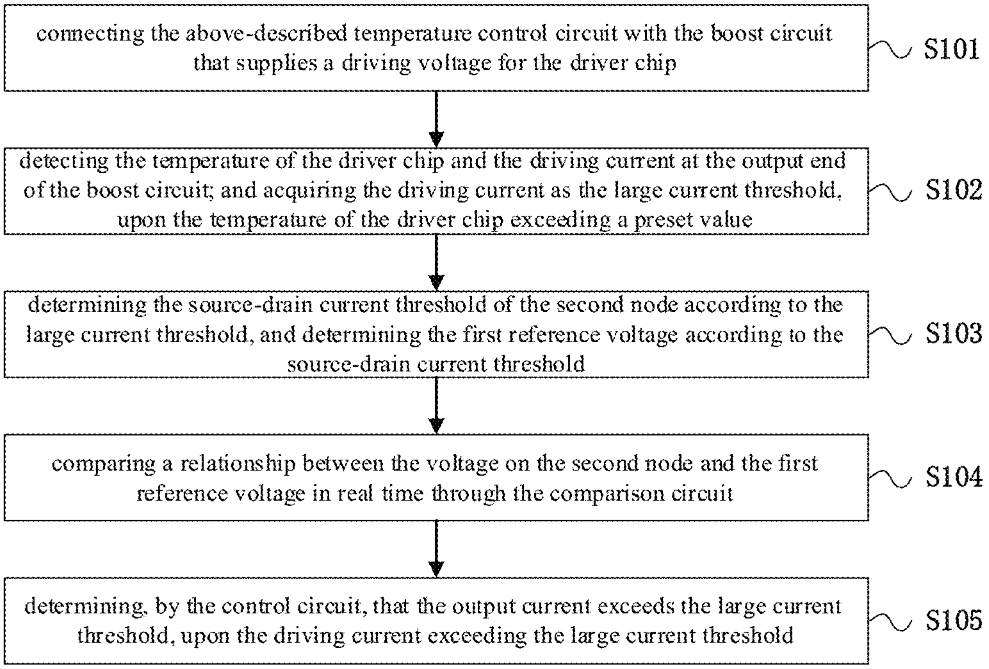
FIG. 16 is a flow chart of a temperature control method of a driver chip provided by an embodiment of the present disclosure.

An embodiment of the present disclosure further provides a temperature control method of a driver chip. FIG. 16 is a flow chart of a temperature control method of a driver chip provided by an embodiment of the present disclosure. As illustrated by FIG. 16, the temperature control method of the driver chip includes steps S101 to S105.

Step S101: connecting the above-described temperature control circuit with the boost circuit that supplies a driving voltage for the driver chip.

Step S102: detecting the temperature of the driver chip and the driving current at the output end of the boost circuit; and acquiring the driving current as the large current threshold, upon the temperature of the driver chip exceeding a preset value.

Step S103: determining the source-drain current threshold of the second node according to the large current threshold, and determining the first reference voltage according to the source-drain current threshold.

Step S104: comparing a relationship between the voltage on the second node and the first reference voltage in real time through the comparison circuit.

Step S105: determining, by the control circuit, that the output current exceeds the large current threshold, upon the driving current exceeding the large current threshold.

In the temperature control method of the driver chip provided by the embodiment of the present disclosure, the large current threshold is acquired by detecting the temperature of the driver chip and the driving current at the output end of the boost circuit, then, the first reference voltage is determined through the large current threshold, and then the comparison circuit is used to compare whether the voltage on the second node is greater than the first reference voltage to determine whether the present driving current exceeds the large current threshold, so as to determine whether the driver chip needs to be cooled; and then the temperature of the driver chip is lowered through a series of cooling modes, so as to avoid burning the driver chip.

In some examples, the temperature control method further includes: reducing, by the control circuit, the duty cycle or the pulse frequency of the gate electrode signal on the gate electrode of the switching transistor, to lower the temperature of the driver chip, upon the control circuit determining that the output current exceeds the large current threshold.

For example, as illustrated by FIG. 2, the duty cycle can be reduced by reducing Ton time and increasing Toff1 time, but maintaining the cycle unchanged, i.e., Ton+Toff=Ton1+Toff1, so as to reduce the output voltage, i.e., the driving voltage. That is to say, upon the ON time of the switching transistor decreasing, charge time of the input end of the boost circuit or the power supply end to the inductor 210 decreases, resulting in decrease in overall released electrical energy and decrease in the output voltage.

It should be noted that, considering normal operation of the driver chip and normal display of the picture, it is necessary to set an adjustable minimum voltage Vmin of the output voltage Vout, and the voltage corresponds to a settable duty cycle threshold Dmin; that is to say, upon the control circuit turning down the PWM duty cycle Dpwm, DPWM cannot be made less than Dmin.

In some examples, a plurality of tap positions of Dpwm can be set; upon the control circuit determining that the present current exceeds the large current threshold, the Dpwm tap position can be turned down firstly; after a period of stability, if it is determined that the present current still exceeds the large current threshold, the Dpwm tap position can be further turned down until the present current is less than the large current threshold or Dpwm, or Dpwn has been turned down to the Dmin value.

For example, as illustrated by FIG. 3, the Dpwm value can be reduced by reducing the pulse frequency F of the gate electrode signal, that is, maintaining Ton time unchanged, and increasing Toff2 time, so that the pulse cycle time increases, so the pulse frequency decreases, which can reduce the output voltage. That is to say, as OFF time of the switching transistor increases, discharge time of the boost circuit becomes longer, so an average voltage of the overall released electrical energy decreases, that is, the output voltage decreases.

It should be noted that, considering normal operation of the driver chip and normal display of the picture, it is necessary to set the adjustable minimum voltage Vmin of the output voltage Vout, and the voltage corresponds to the settable pulse frequency threshold Fmin, that is, upon the control circuit turning down the pulse frequency F, the pulse frequency F cannot be less than the pulse frequency threshold Fmin.

In some examples, a plurality of tap positions of F can be set; upon the control circuit determining that the present current exceeds the large current threshold, the F tap position can be turned down firstly; after a period of stability, if it is determined that the present current still exceeds the large current threshold, the F tap position can be further turned down, until the present current is less than the large current threshold or F, or F has been turned down to the Fmin value.

In some examples, the temperature control method further includes reducing the grayscale of the display picture to lower the temperature of the driver chip, upon the control circuit determining that the output current exceeds the large current threshold.

For example, as illustrated by FIG. 10, the accurate color-temperature adjusting unit can be used to switch from LUT1 to LUT2, thereby reducing the grayscale of the display picture. After the grayscale of the actual realistic picture decreases, a voltage fluctuation range of pixel unit charge and discharge decreases upon the displayed lines having different grayscales. As illustrated by FIG. 11, the pixel voltage corresponds to the grayscale; upon the pixel unit being charged from L0 to L253, an actual charge grayscale of the first display lookup table (LUT1) is 4048 positive polarity, while an actual charge grayscale of the second display lookup table (LUT2) is 3568 positive polarity. It can be seen that voltage fluctuation of the second display lookup table (LUT2) is significantly smaller than fluctuation of the first display lookup table (LUT1), so overall load of the display apparatus is reduced; because the load of the display apparatus is supplied by the driver chip, power consumption of the driver chip can be ultimately reduced, so that power consumption of the driver chip can be reduced.

In some examples, the temperature control method further includes reducing the times of polarity reversal of the display picture to lower the temperature of the driver chip, upon the control circuit determining that the output current exceeds the large current threshold.

For example, as illustrated by FIG. 12, the times of polarity reversal of the display picture can be reduced through the polarity reversing unit, for example, switching from 1+2H polarity reversal to 1+4H polarity reversal or the Column driving mode, which, thus, can also reduce the load of the display apparatus, to reduce power consumption of the driver chip, and further lower the temperature of the driver chip.

In some examples, the temperature control method further includes reducing the refresh frequency of the display picture to lower the temperature of the driver chip, upon the control circuit determining that the output current exceeds the large current threshold.

For example, as illustrated by FIG. 13A, an input 75-Hz refresh frequency can be reduced to a 60-Hz refresh frequency by increasing vertical blank time; the load of the display apparatus can be roughly estimated to have decreased by (75−60)/75*100%=20%; if it is reduced from a higher frequency to a lower frequency, a reduction proportion of power consumption will be higher. Thus, power consumption of the driver chip also decreases, which also lowers the temperature of the driver chip. As illustrated by FIG. 13B, the micro-control unit can also directly control clipping data of an odd frame or an even frame, and a frequency of output data can be directly halved; or, the micro-control unit can also control clipping one frame of data every N frames, and then an output frequency will change to (N−1)/N of the original frequency, which, thus, can also reduce the load on the display apparatus, so as to lower the temperature of the driver chip.

The relevant description of FIG. 13A and FIG. 13B can be referred to for a specific mode of reducing the refresh frequency of the display picture to lower the temperature of the driver chip as described above, and no details will be repeated here.

In some examples, the temperature control method further includes reducing the gamma voltage value of the display picture to lower the temperature of the driver chip, upon the control circuit determining that the output current exceeds the large current threshold.

For example, one of the first gamma voltage bank A and the second gamma voltage bank B can be selected for output. The second gamma voltage bank B is a preset group of gamma voltages that are lower than the voltage of the first gamma voltage bank A; and because gamma voltages corresponding to all the grayscales are all lower than the gamma voltages in the first gamma voltage bank A, upon switching to the second gamma voltage bank B, the load on the display apparatus is also smaller, thereby lowering the temperature of the driver chip.

The relevant description of FIG. 14 can be referred to for a specific mode of reducing the gamma voltage value of the display picture to lower the temperature of the driver chip as described above, and no details will be repeated here.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In the case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. A temperature control circuit of a driver chip, comprising:

a switching transistor, comprising a gate electrode, a first electrode and a second electrode;

a comparison circuit, comprising a first comparison end and a second comparison end; and a control circuit, comprising a first connection end, a second connection end, and a third connection end, wherein, the first connection end is electrically connected with the gate electrode of the switching transistor; the second connection end is electrically connected with the first comparison end; and the third connection end is electrically connected with an output end of the comparison circuit;

the first electrode of the switching transistor is connected with a first node located between an inductor of a boost circuit and a Schottky diode; the second comparison end and the first electrode or the second electrode of the switching transistor are connected to a second node; the boost circuit is configured to supply a driving voltage to the driver chip;

the control circuit is configured to output a first reference voltage to the comparison circuit through the second connection end; the comparison circuit is configured to compare a magnitude relationship between a voltage on the second comparison end and the first reference voltage and output a comparison result; the control circuit acquires the comparison result through the third connection end, and determines whether an output current on the boost circuit is excessively large according to the comparison result, the second electrode of the switching transistor is grounded; the second comparison end and the first electrode of the switching transistor are connected to the second node; and the second node is connected with the first node, the temperature control circuit further comprises a first resistor, located between the first electrode of the switching transistor and the second node.

2. The temperature control circuit according to claim 1, wherein, the first reference voltage is a voltage on the second node upon a temperature of the driver chip exceeding a preset value.

3. The temperature control circuit according to claim 1, wherein, the control circuit is further configured to lower a temperature of the driver chip according to the comparison result.

4. The temperature control circuit according to claim 3, wherein, the control circuit is configured to supply a gate electrode signal to the gate electrode of the switching transistor through the first connection end; and the control circuit is further configured to adjust a duty cycle or a pulse frequency of the gate electrode signal according to the comparison result.

5. The temperature control circuit according to claim 1, wherein, the comparison circuit comprises:

a first operational amplifier, comprising a first input end, a second input end, an output end, a first power input end and a second power input end, wherein, the first input end is the first comparison end; the second input end is the second comparison end; the first power input end is connected with a first positive voltage; and the second power input end is connected with a negative voltage.

6. The temperature control circuit according to claim 5, wherein, the comparison circuit further comprises:

a second operational amplifier, comprising a first input end, a second input end, an output end, a first power input end, and a second power input end, wherein, the first input end is connected with a 0V voltage or a second reference voltage less than the first reference voltage; the second input end is connected with an output end of the first operational amplifier; the first power input end is connected with a second positive voltage; and the second power input end is connected with the 0V voltage.

7. A power management integrated chip, comprising the comparison circuit and the control circuit in the temperature control circuit according to claim 1.

8. A timing control driver board, comprising:

a boost circuit, configured to supply the driving voltage to the driver chip; and the temperature control circuit according to claim 1.

9. The timing control driver board according to claim 8, further comprising:

a power management integrated chip, wherein, the comparison circuit, the control circuit, and the switching transistor in the temperature control circuit are integrated into the power management integrated chip.

10. The timing control driver board according to claim 8, wherein, the boost circuit comprises:

an input capacitor, having one end connected with an input end of the boost circuit;

an inductor, having one end connected with the input end of the boost circuit, and another end connected with the first node;

the Schottky diode, having one end connected with the first node, and the another end connected with an output end of the boost circuit; and an output capacitor, having one end connected with the output end of the boost circuit.

11. The timing control driver board according to claim 8, further comprising a timing control chip, wherein, the timing control chip comprises:

a micro-control unit; and an accurate color-temperature adjusting circuit, configured to adjust a grayscale of a display picture, wherein, the micro-control unit is respectively in communicative connection with the control circuit and the accurate color-temperature adjusting circuit; and the micro-control unit is configured to reduce the grayscale of the display picture according to the comparison result through the accurate color-temperature adjusting circuit.

12. The timing control driver board according to claim 11, wherein, the timing control chip further comprises:

a polarity reversing circuit, being in communicative connection with the micro-control unit;

wherein, the micro-control unit is configured to reduce times of polarity reversal of the display picture through the polarity reversing circuit according to the comparison result.

13. The timing control driver board according to claim 11, wherein, the timing control chip further comprises:

a frequency-variable refreshing circuit, being in communicative connection with the micro-control unit;

wherein, the micro-control unit is configured to reduce a refresh frequency of the display picture according to the comparison result through the frequency-variable refreshing circuit.

14. The timing control driver board according to claim 11, further comprising a programmable gamma chip, wherein, the programmable gamma chip comprises:

a controller, being in communicative connection with the micro-control unit;

a first gamma voltage bank, being in communicative connection with the controller;

a second gamma voltage bank, being in communicative connection with the controller, wherein, the micro-control unit is configured to switch between the first gamma voltage bank and the second gamma voltage bank through the controller according to the comparison result;

with respect to a same grayscale, a gamma voltage in the second gamma voltage bank is less than a gamma voltage in the first gamma voltage bank.

15. A display apparatus, comprising the timing control driver board according to claim 8.

16. A temperature control method of the driver chip, comprising:

connecting the temperature control circuit according to claim 1 with the boost circuit that supplies the driving voltage for the driver chip;

detecting a temperature of the driver chip and a driving current at an output end of the boost circuit; and acquiring the driving current as a large current threshold, upon the temperature of the driver chip exceeding a preset value;

determining a source-drain current threshold of the second node according to the large current threshold, and determining the first reference voltage according to the source-drain current threshold;

comparing a relationship between a voltage on the second node and the first reference voltage in real time through the comparison circuit; and determining, by the control circuit, that the output current exceeds the large current threshold, upon the driving current exceeding the large current threshold.

17. A temperature control circuit of a driver chip, comprising:

a switching transistor, comprising a gate electrode, a first electrode and a second electrode;

a comparison circuit, comprising a first comparison end and a second comparison end; and a control circuit, comprising a first connection end, a second connection end, and a third connection end, wherein: the first connection end is electrically connected with the gate electrode of the switching transistor; the second connection end is electrically connected with the first comparison end; and the third connection end is electrically connected with an output end of the comparison circuit;

the first electrode of the switching transistor is connected with a first node located between an inductor of a boost circuit and a Schottky diode; the second comparison end and the first electrode or the second electrode of the switching transistor are connected to a second node; the boost circuit is configured to supply a driving voltage to the driver chip; and the control circuit is configured to output a first reference voltage to the comparison circuit through the second connection end; the comparison circuit is configured to compare a magnitude relationship between a voltage on the second comparison end and the first reference voltage and output a comparison result; the control circuit acquires the comparison result through the third connection end, and determines whether an output current on the boost circuit is excessively large according to the comparison result, wherein the temperature control circuit further comprises:

a first resistor comprising a first end and a second end, wherein the second comparison end, the second electrode of the switching transistor, and the first end of first resistor are connected to the second node, wherein the second end of the first resistor is grounded; and a second resistor comprising a first end and a second end, wherein the first end of the second resistor is connected with the gate electrode of the switching transistor, wherein the second end of the second resistor is grounded.

* * * * *